United States Patent [19]

Shimizu et al.

[11] Patent Number: 5,357,385
[45] Date of Patent: Oct. 18, 1994

[54] TRAY-TYPE CASSETTE LOADING COMPATIBLE WITH TWO DIFFERENT SIZED CASSETTES FOR RECORDING/REPRODUCING APPARATUS

[75] Inventors: Toshiaki Shimizu, Kanagawa; Shigeru Yokota, Yokohama; Mitsuhiko Hara, Kawasaki, all of Japan

[73] Assignee: Victor Company of Japan, Ltd., Yokohama, Japan

[21] Appl. No.: 961,028

[22] Filed: Oct. 14, 1992

Related U.S. Application Data

[63] Continuation of Ser. No. 568,897, Aug. 17, 1990.

[30] Foreign Application Priority Data

Aug. 17, 1989 [JP] Japan ................................. 1-211872
Aug. 31, 1989 [JP] Japan ................................. 1-226141

[51] Int. Cl.$^5$ ............................................. G11B 5/008
[52] U.S. Cl. ............................... 360/96.5; 360/94; 360/85
[58] Field of Search .................. 360/92, 94, 95, 85, 360/90, 96.5, 96.6

[56] References Cited

U.S. PATENT DOCUMENTS

| 4,206,487 | 6/1980 | Sato ................................ | 360/94 |
| 4,216,509 | 8/1980 | Sato et al. ....................... | 360/94 |
| 4,706,141 | 11/1987 | Oba et al. ....................... | 360/96.6 |
| 4,866,550 | 9/1989 | Ohashi et al. .................. | 360/94 |
| 4,965,683 | 10/1990 | Otani ............................... | 360/94 |
| 4,992,894 | 2/1991 | Ohashi ............................ | 360/94 |
| 5,018,030 | 5/1991 | Ohashi ............................ | 360/94 |
| 5,025,331 | 6/1991 | Hirayama et al. .............. | 360/94 |
| 5,032,939 | 7/1991 | Mihara et al. .................. | 360/94 |

FOREIGN PATENT DOCUMENTS

| 140211 | 5/1985 | European Pat. Off. . |
| 177133 | 4/1986 | European Pat. Off. . |
| 58-88881 | 5/1983 | Japan ........................ 360/94 |
| 58-115665 | 7/1983 | Japan ........................ 360/94 |
| 61-182661 | 8/1986 | Japan . |
| 196859 | 4/1989 | Japan . |
| 1173351 | 7/1989 | Japan . |

OTHER PUBLICATIONS

Patent Abstracts of Japan, vol. 12, No. 492 (P-804) 22 Dec. 1988, & JP-A-63 201941 (Matsushita Electric Ind Co Ltd) 22 Aug. 1988, *the whole document*.
Patent Abstracts of Japan, vol. 7. No. 241 (P-232) (1386) 26 Oct. 1983, & JP-A-58 128066 (Canon KK) 30 Jul. 1983, *the whole document*.
Patent Abstracts of Japan, vol. 13, No. 159 (P-858) 18 Apr. 1989, & JP-A-63 317971 (Matsushita Electric Ind Co Ltd) 26 Dec. 1988, *the whole document*.
Patent Abstracts of Japan, vol. 11, No. 2 (P-532)(2449) 6, Jan. 1987, & JP-A-61 178774 (Matsushita Electric Ind Co Ltd) 11 Aug. 1986, *the whole document*.
Patent Abstracts of Japan, vol. 11, No. 2 (P-532)(2449) 6 Jan. 1987, & JP-A-61 180958 (Matsushita Electric Ind Co Ltd) 13 Aug. 1986, *the whole document*.
Patent Abstracts of Japan, vol. 11, No. 236 (P-601)(2683) 4 Aug. 1987, & JP-A-62 047859 (Sony Corp) 02 Mar. 1987, *the whole document*.

*Primary Examiner*—A. J. Heinz
*Assistant Examiner*—David D. Davis
*Attorney, Agent, or Firm*—Pollock, Vande Sande & Priddy

[57] ABSTRACT

A cassette loading device for a cassette recording/reproducing apparatus includes a cassette tray reciprocably movable between a first position in which the cassette tray is retracted into a body of the recording/reproducing apparatus for loading a cassette in a predetermined position, and a second position in which the cassette tray is ejected forwardly from the front panel of the body for attachment and detachment of the cassette relative to the cassette tray, a holder disposed in the cassette tray for holding the cassette, and a mechanism responsive to the movement of the cassette tray toward the second position for causing the holder to tilt its forward end upwardly.

10 Claims, 24 Drawing Sheets

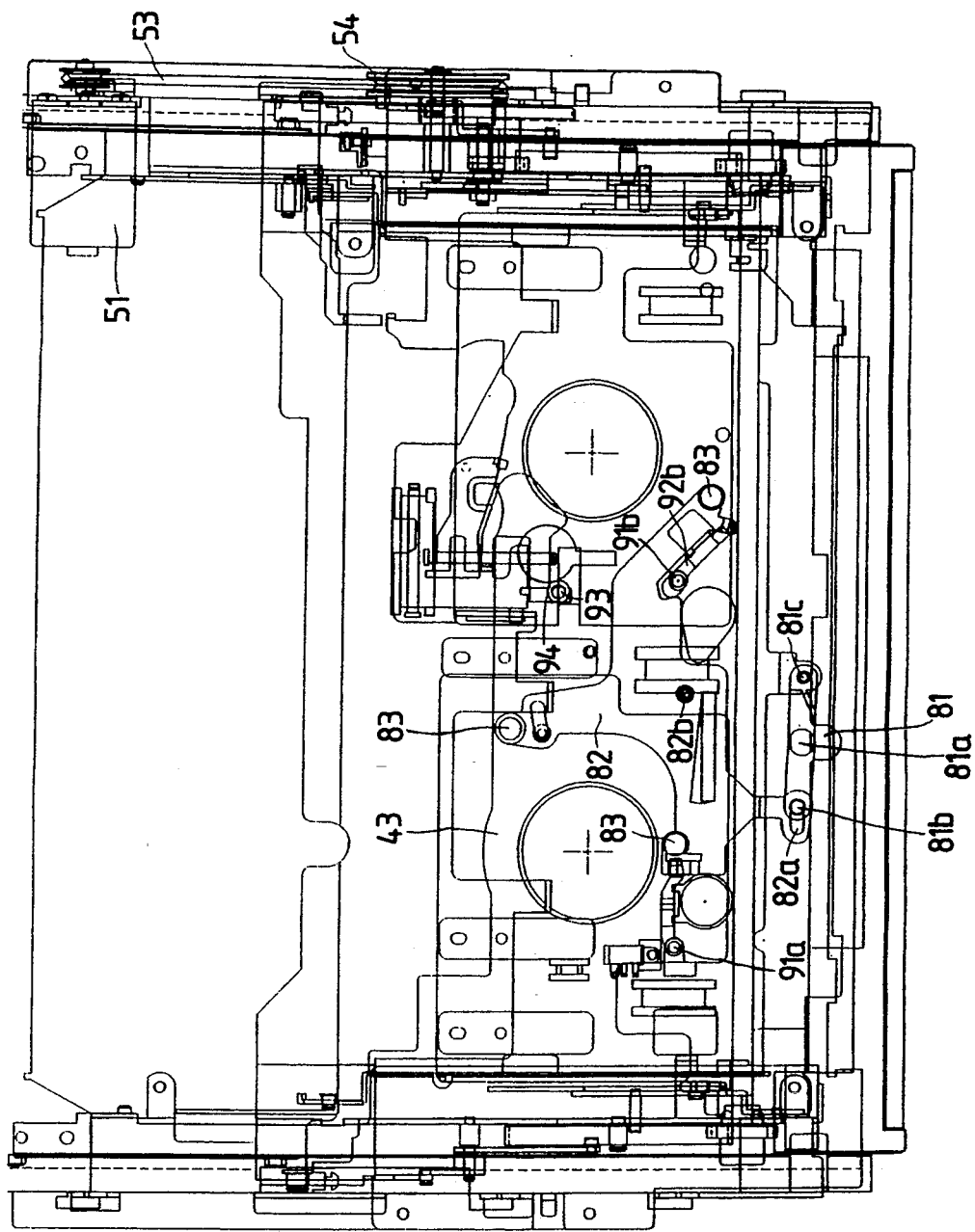

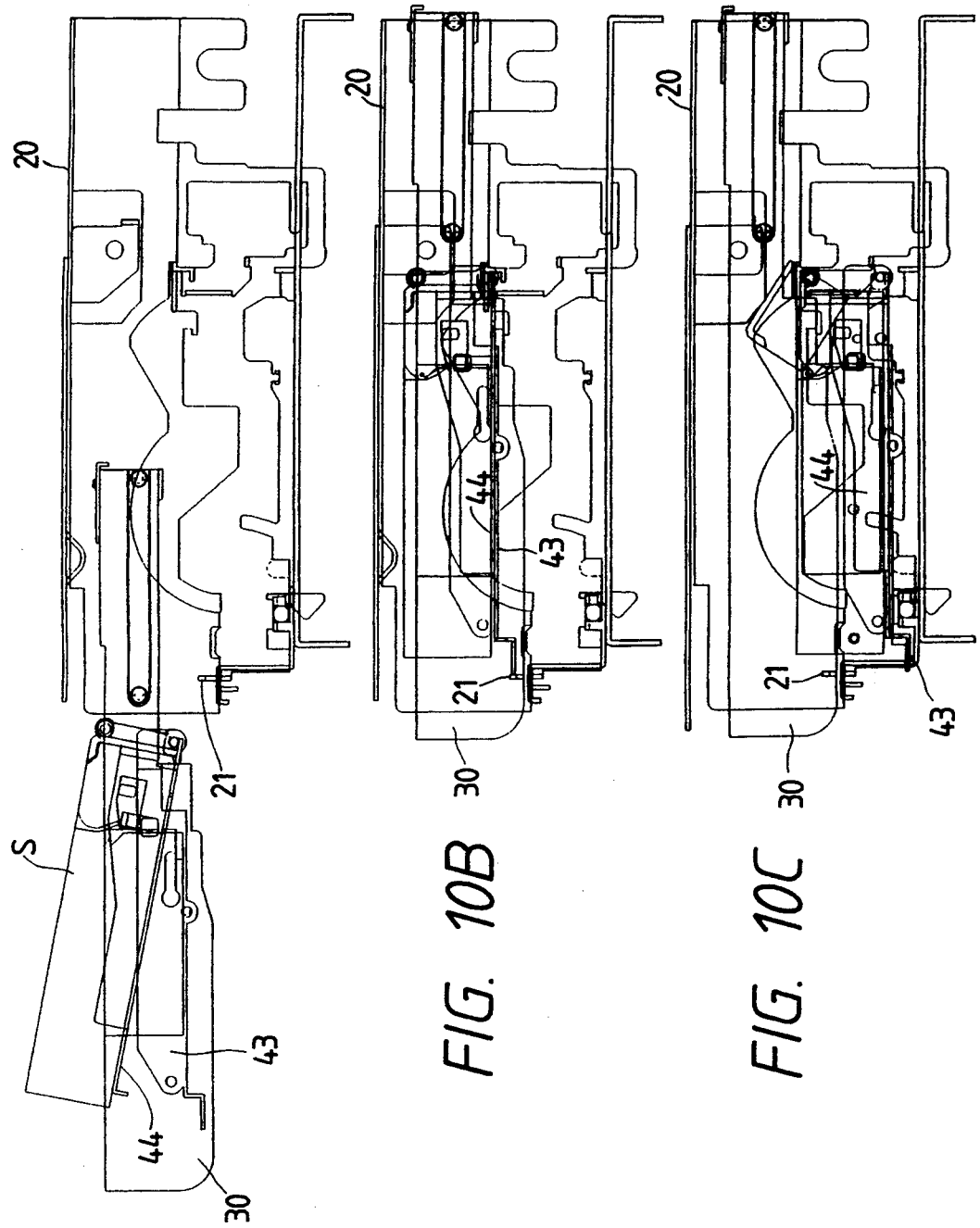

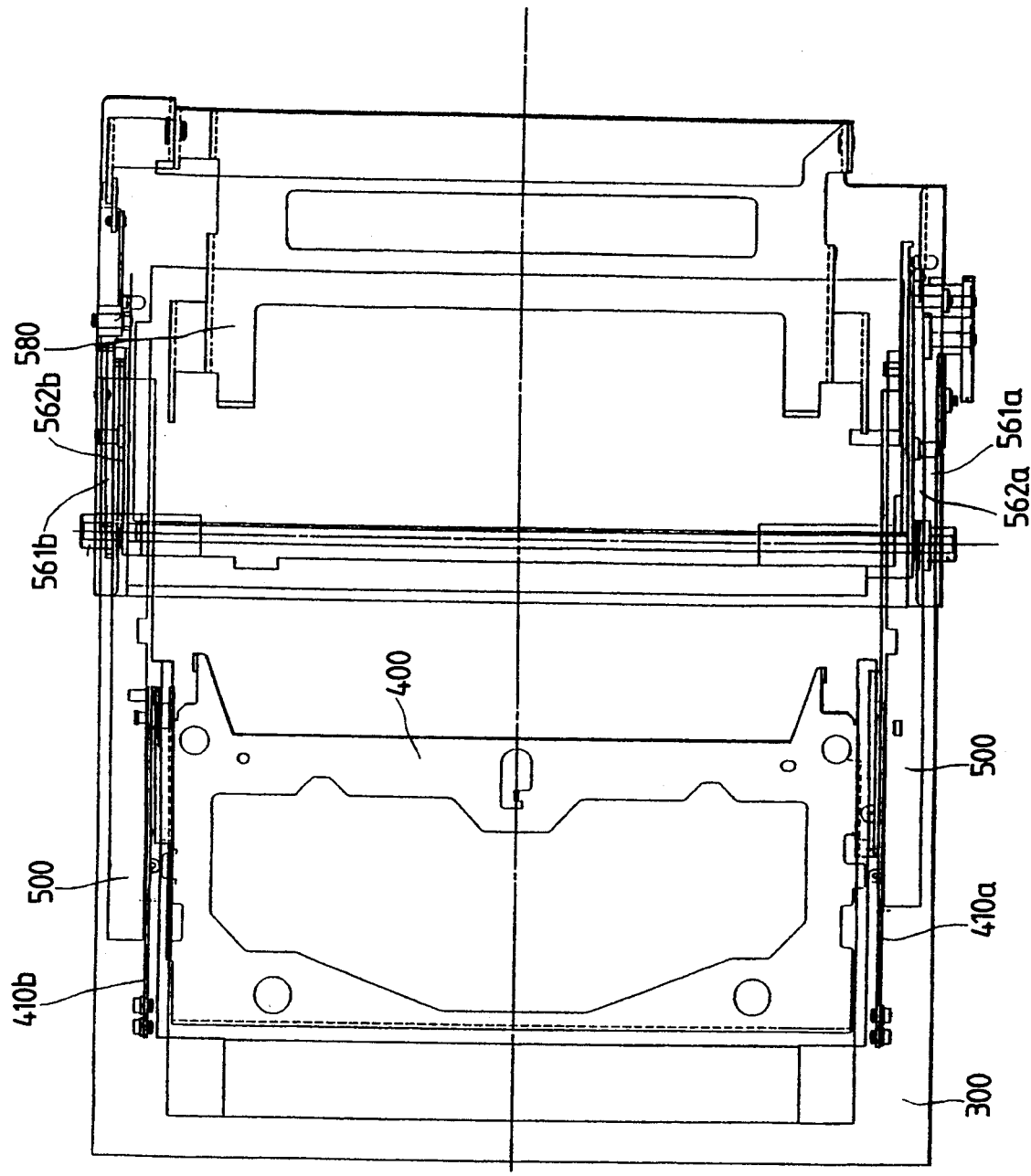

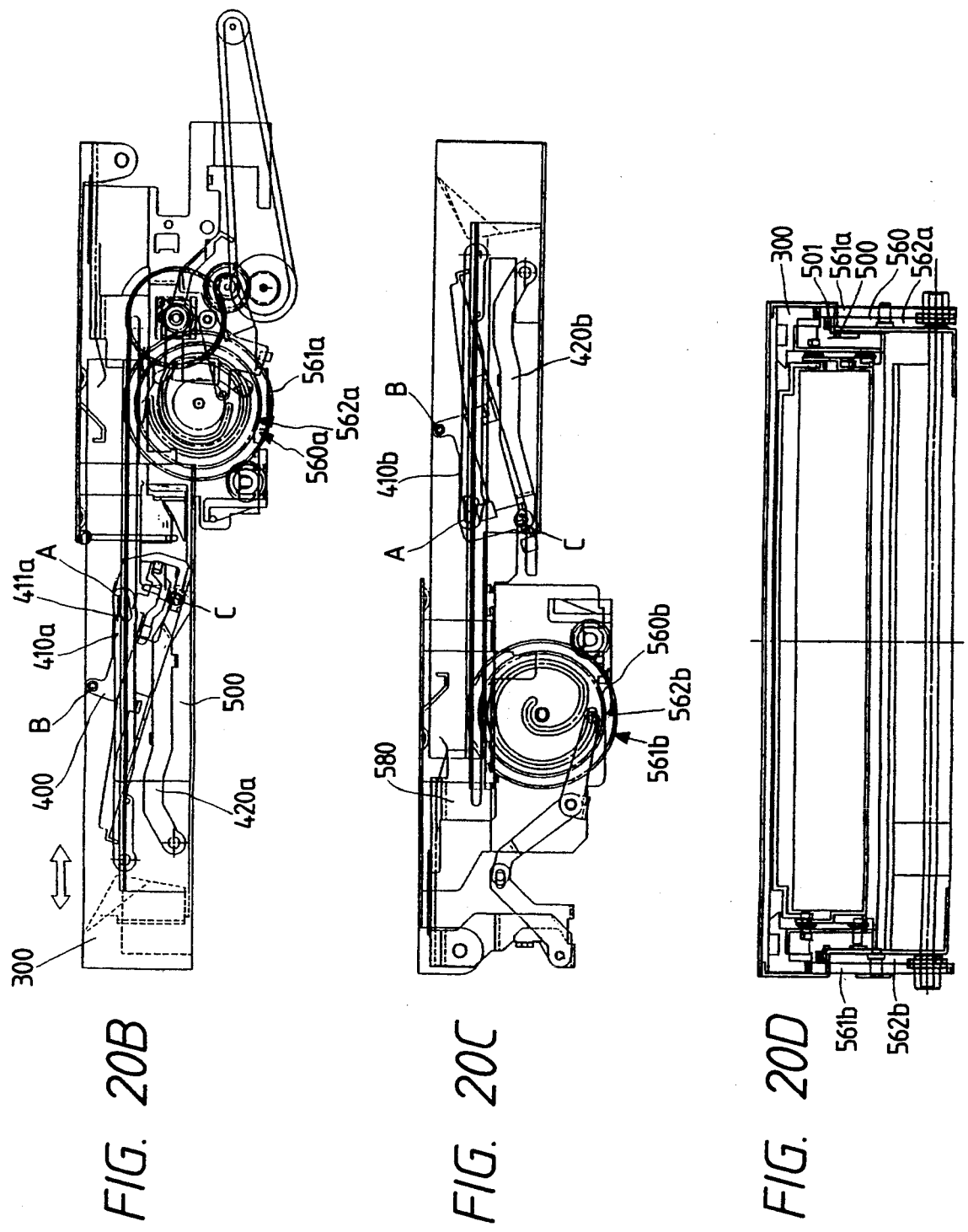

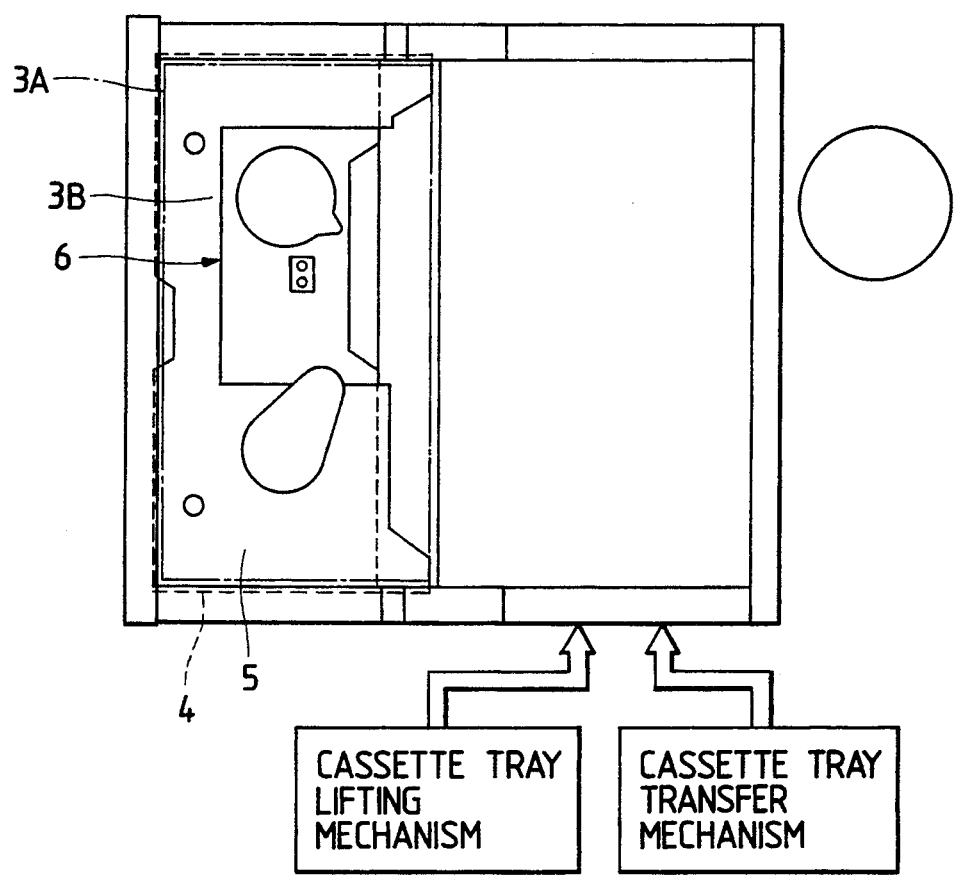

TRAY-TYPE CASSETTE LOADING COMPATIBLE WITH TWO DIFFERENT SIZED CASSETTES FOR RECORDING/REPRODUCING APPARATUS

This application is a continuation of Ser. No. 07/568,897 filed on Aug. 17, 1990.

FIELD OF THE INVENTION

The present invention relates to a cassette loading device for recording/reproducing apparatus such as video cassette recorders. More particularly, this invention concerns a so-called tray type cassette loading device which includes a cassette tray adapted to be ejected from the front panel of a body of the recording/reproducing apparatus for supporting thereon a cassette to be recorded or played back and also for being drawn into the body to set the cassette in a predetermined position.

BACKGROUND OF THE INVENTION

In cassette loading devices of cassette recording/reproducing apparatus, a front loading system is widely used. The front loading system is classified into two types, namely a slot-in type and a tray type to which this invention pertains.

Cassette loading devices of the tray type are known as disclosed, for example, in Japanese Patent Laid-open Publication Nos. 61-182661 and 1-96859, which include a cassette tray adapted to be ejected from the front panel of a recording/reproducing apparatus for attachment/detachment of a cassette relative to a holder of the cassette tray.

The cassette loading device disclosed in Japanese Patent Laid-open Publication No. 61-182261, as reillustrated here in FIGS. 25 and 26, is constructed to be used with a single cassette and includes a cassette tray 4 adapted to be ejected from the front panel 2 of a recording/reproducing apparatus 1 for setting or removing a cassette 3. The cassette tray 4 has a holder 5 and left and right side walls recessed as at 4a, 4b. For accepting a cassette 3, the cassette tray 4 is ejected from the front panel 2 of the recording/reproducing apparatus 1 and while keeping this condition, the cassette 3 while being gripped at its opposite sides by user's fingers is placed down onto the holder 5. In this instance, the cutout recesses 4a, 4b receive the user's fingers. To remove the cassette 3, the cassette 3 is gripped by the user's fingers received in the recesses 4a, 4b from the opposite directions and then is pulled out upwardly away from the holder 5.

The cassette loading device disclosed in Japanese Patent Laid-open Publication No. 1-96859, as reillustrated here in FIG. 27, is so designed as to accommodate two different cassettes having different shapes and configurations. In the illustrated embodiment, the cassette loading device is used with a standard cassette 3A and a compact cassette 3B which is smaller in size than the standard cassette 3A. A cassette tray 4 of the cassette loading device is ejected from the front panel of a recording/reproducing apparatus and then a standard cassette 3A or a compact cassette 3B is set on a holder 5 of the cassette tray 4. Attachment/detachment of the standard cassette 3A relative to the cassette tray 4 is achieved in the same manner as described above. For attachment of the compact cassette 3B, the holder 5 of the cassette tray 4 has a recess 6 having a shape complementary in contour to the shape of the bottom of the compact cassette 3B. The compact cassette 3b is retained in the recess 6 against displacement.

The known cassette loading devices are however defective from the manipulative point of view, as described below.

For attachment and detachment of a cassette relative to the cassette tray ejected from the recording/reproducing apparatus, the cassette is moved vertically toward and away from the cassette tray while the cassette is being kept in a horizontal posture by gripping at its opposite sides with the user's fingers. The cassette attaching/detaching operation needs care and cannot be performed by one hand of the operator. The cassette loading device is, therefore, uneasy to handle. The front panel of the recording/reproducing apparatus is likely to hinder smooth attachment and detachment of the cassette relative to the cassette tray. Furthermore, since the recess provided for holding a compact cassette in the cassette tray is relatively shallow and hence insufficient to provide a positive hold for the compact cassette. The compact cassette is likely to be displaced off the recess when subjected to impact forces applied from the outside of the recording/reproducing apparatus or during the movement of the cassette tray. Accurate positioning of the compact cassette to a fixed recording/playback position cannot, therefore, be performed. The cassette tray having the recess is thicker than a cassette without the recess and hence a flat recording/reproducing apparatus is difficult to obtain.

SUMMARY OF THE INVENTION

With the foregoing drawbacks of the prior art in view, it is an object of the present invention to provide a cassette loading device for cassette recording/reproducing apparatus which is easy to handle and enables the user to perform cassette attaching/detaching operation with its one hand.

Another object of the present invention is to provide a cassette loading apparatus incorporating structural features which enable attachment and detachment of a cassette without interference between a holder and the front panel of a recording/reproducing apparatus and hence provides an increased degree of freedom for the design of the front panel.

A further object of the present invention is to provide a cassette loading device capable of accommodating two cassette of different sizes without incurring enlargement of the overall thickness of the device.

A still further object of the present invention is to provide a cassette loading device capable of holding a cassette stably in position against displacement relative to a cassette tray.

According to a first aspect of the present invention, there is provided a cassette loading device for a cassette recording/reproducing apparatus including a body having a front panel, comprising: a cassette tray reciprocably movable between a first position in which the cassette tray is retracted into the body of the recording/reproducing apparatus for loading a cassette in a predetermined position, and a second position in which the cassette tray is ejected forwardly from the front panel of the body for attachment and detachment of the cassette relative to the cassette tray; a holder disposed in the cassette tray for holding the cassette; and means responsive to the movement of the cassette tray toward the second position for causing the holder to tilt its forward and upwardly.

The cassette loading device may include means for forcing the holder to move from a tilted position to a horizontal position in response to the movement of the cassette tray toward the first position.

According to a preferred embodiment, the cassette tray includes at least one slide plate movable along with the cassette tray at a speed which is different than the speed of movement of said cassette tray, the slide plate being engageable with the holder to progressively tilt the latter about a rearward end thereof due to a difference between the amount of movement of the cassette tray and the amount of movement of the slide plate as said cassette tray approaches the second position.

For use with a first cassette and a second cassette which is smaller in size than the first cassette, the holder may include a first holder member for supporting thereon the first cassette and a second holder member disposed below the first holder member for supporting thereon the second cassette, the first holder member having an opening complementary in contour to the shape of the second cassette for placement of the second cassette on the first holder member, the second holder member being tiltable in response to the movement of the cassette tray toward the second position. The holder has at least one hole. A slider is movable between an operative position to open the hole when the first cassette is disposed on the holder and an inoperative position to close the hole when the second cassette is disposed on the holder. A first reference pin is engageable with the first cassette for holding the first cassette in a first level when the first cassette disposed on the holder is loaded in a predetermined position. A second reference pin is engageable with the slider while being disposed in the inoperative position, for holding the second cassette in a second level via the slider and the holder when the second cassette disposed on the holder is loaded in the predetermined position.

According to a second aspect of the present invention, there is provided a cassette loading device for a recording/reproducing apparatus for loading a cassette in a predetermined position of the recording/reproducing apparatus, the device comprises: a holder for selectively supporting thereon a first cassette and a second cassette which is different in size to the first cassette, the holder having at least one hole; a slider movable between an operative position to open the hole when the first cassette is disposed on the holder and an inoperative position to close the hole when the second cassette is disposed on the holder; a first reference pin engageable with the first cassette for holding the first cassette in a first level when the first cassette disposed on the holder is loaded in a predetermined position; and a second reference pin engageable with the slider while being disposed in the inoperative position, for holding the second cassette in a second level via the slider and the holder when the second cassette disposed on the holder is loaded in the predetermined position.

According to a third aspect of the invention, there is provided a cassette loading device for a recording/reproducing apparatus having a main deck, the device comprising: a holder for supporting thereon a cassette having a reference hole; a reference pin engageable with the reference hole when the cassette is disposed on the holder; a first engagement portion disposed on the holder at a side facing the main deck; a second engagement portion adapted to be disposed on the main deck and engageable with the first engagement portion when the holder is disposed in a predetermined position; and means for forcing the cassette against the holder.

According to a fourth aspect of the invention, there is provided a cassette loading device for a recording/reproducing apparatus having a main deck, the device comprising: a holder for selectively supporting thereon a first cassette having a first reference hole and a second cassette which is different in size to the first cassette and has a second reference hole, the holder having at least one first hole alignable with the first reference hole when the first cassette; a first reference pin adapted to be disposed on the main deck and engageable with the first hole when the first cassette supported on the holder is loaded in a predetermined position; a second reference pin retractably mounted on the holder and movable into and away from the second reference hole when the second cassette is disposed on the holder; a first engagement portion disposed on the holder at a side facing the main deck; a second engagement portion adapted to be disposed on the main deck and engageable with the first engagement portion when the holder is disposed in the predetermined position; and means for forcing the cassette against the holder.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a plan view of the cassette loading device with the cassette tray drawn in the housing body;

FIG. 10A through 10C are side views showing a manner in which the holder is raised and lowered by the holder lifting mechanism;

FIG. 20A is a plan view of a cassette loading device according to another embodiment of the invention, showing a cassette tray ejected from a housing body;

FIG. 20B is a right side view of FIG. 20A;

FIG. 20C is a left side view of FIG. 20A;

FIG. 20D is a front elevational view of FIG. 20A;

FIG. 27 is a plan view of another known cassette loading device.

DETAILED DESCRIPTION OF THE PREFERRED EMBODIMENTS

Figure 1:
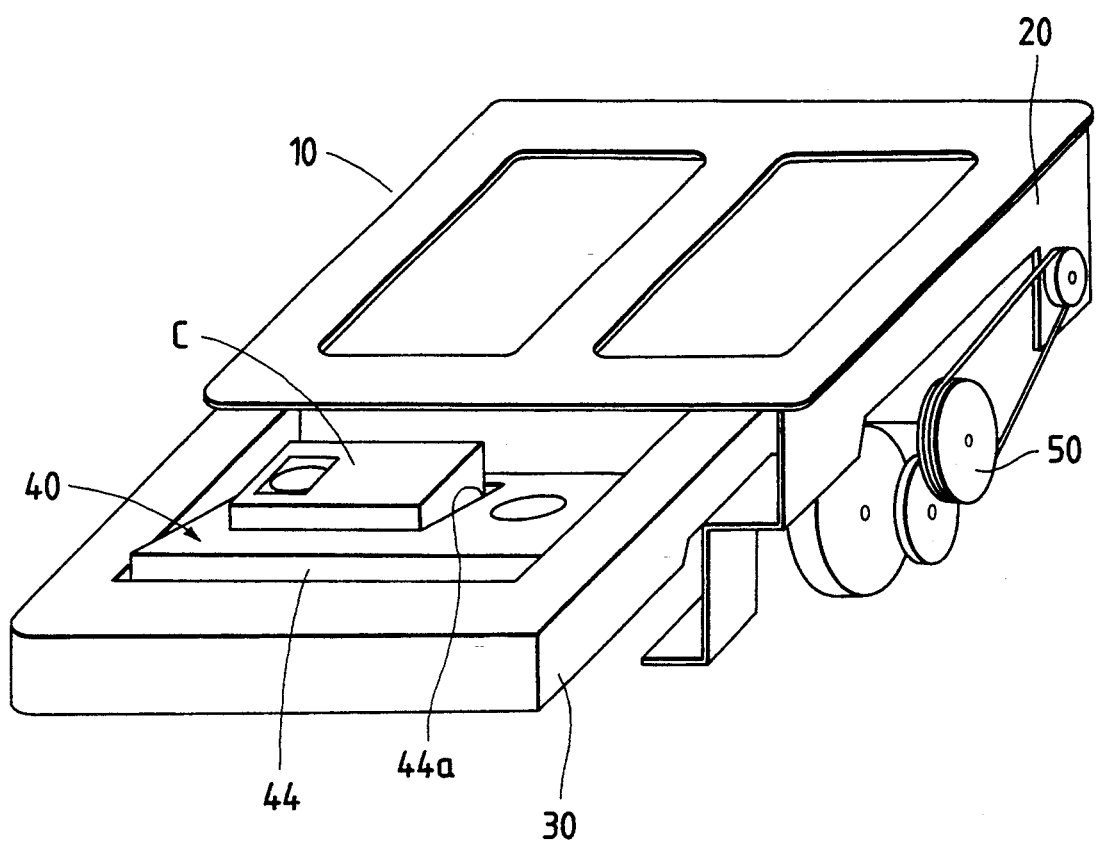
FIG. 1 is a perspective view of a cassette loading device according to the present invention, showing a cassette tray ejected for receiving a cassette.

FIGS. 1, 2A–2C and 3 show a cassette loading device according to one embodiment of the invention. The cassette loading device shown in FIGS. 1 and 2A–2C has a cassette tray ejected from a body of the device for setting a cassette, while the cassette tray shown in FIG. 3 is drawn in the body of the device.

The cassette loading device includes a cassette housing body 10 which generally comprises a bracket 20, a cassette tray 30, a holder 40, a driving force transmitting mechanism 50, a holder lifting mechanism 60 (FIGS. 9 and 10A–10C), a cassette presser mechanism 70 (FIGS. 11 and 12A–13B), a holder reference-surface height adjustment mechanism 80 (FIGS. 14–16), and a cassette positioning mechanism 90 (FIGS. 17A, 17B, 18 and 19).

The bracket 20 is comprised of left and right side plates, a top plate and a bottom plate and is attached to the body of a recording/reproducing apparatus (not shown), such as a video cassette recorder.

The cassette tray 30 is slidably mounted in the bracket 20 and movable to and fro relative to the bracket 20.

The holder 40 is a portion provided in the cassette tray 30 for receiving a magnetic tape cassette C.

The driving force transmitting mechanism 50 is a mechanism for transmitting a driving force from a drive motor to the cassette tray 30 for reciprocating the cassette tray 30.

The holder lifting mechanism 60 is a mechanism for vertically moving the holder 40.

The cassette presser mechanism 70 is a means for depressing the cassette C against the holder 40 to hold the cassette C against wobbling or misplacement.

The holder reference-surface height adjustment mechanism 80 is constructed to change the height of a reference surface of the holder 40.

The positioning mechanism 90 serves to position a compact cassette.

When a cassette to be recorded or played back is to be set on the cassette loading device, the cassette tray 30 is ejected from the front panel (not shown) of the body of the recording/reproducing apparatus. After the cassette is placed on the holder 40 of the cassette tray 30, the cassette tray 30 is horizontally drawn back into the bracket 20 until it reaches a predetermined position. Then, the holder 40 is lowered to set the cassette in a predetermined loading position.

Various mechanisms of the cassette housing body 10 will be described below in greater detail.

The driving force transmitting mechanism 50 is composed of a right transmitting system and a left transmitting system that are mounted on the bracket 20. The right transmitting system includes a loading motor 51, a pulley 54, a speed reducing gear 55 (a composite gear including a large-diameter gear 55a and a small-diameter gear 55b coaxially united together), a pinion gear 56a, a transfer gear 57a. The left transmitting system includes a transfer gear 57b and a pinion gear 56b.

Figure 4:
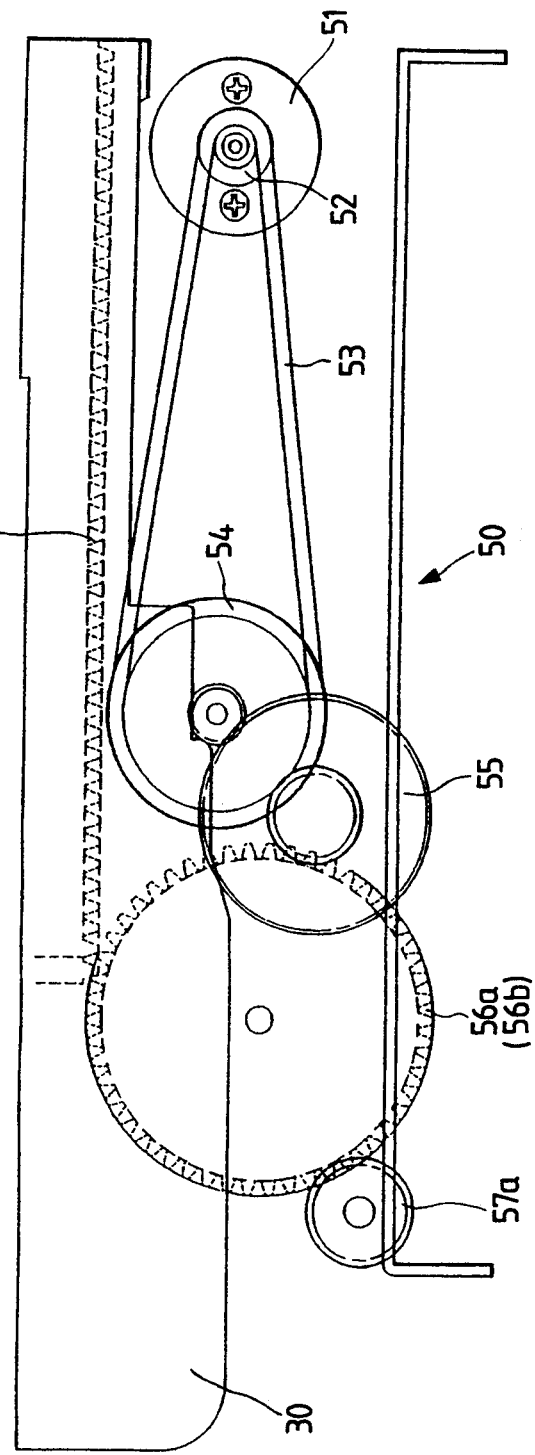
FIG. 4 is a right side view of a portion of the cassette loading device showing the construction of a driving force transmitting mechanism for driving the cassette tray.
Figure 5:
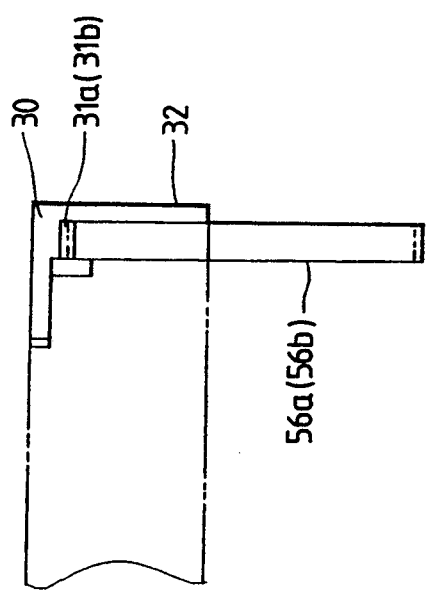
FIG. 5 is a front elevational view of a portion of the cassette loading device showing the construction of a cover of the cassette tray.
Figure 6:
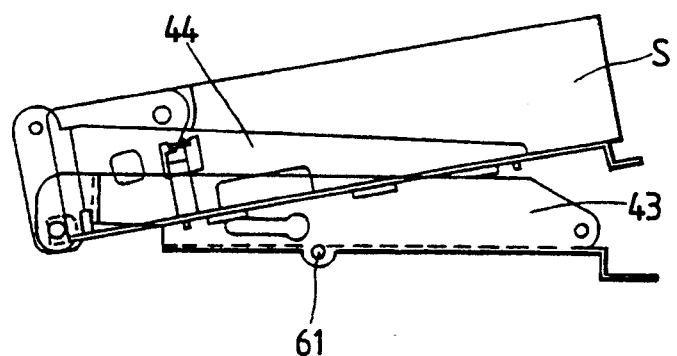
FIG. 6 is a side view illustrative of the operation of a holder when a standard cassette is placed.
Figure 7:
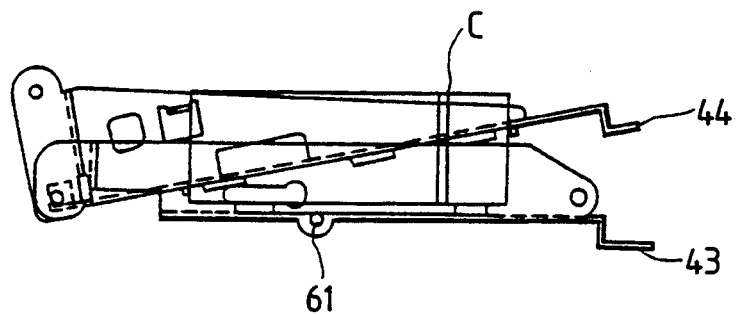
FIG. 7 is a side view illustrative of the operation of the holder when a compact cassette is placed.

In the right transmitting system, as shown in FIG. 4, a driving force or power generated by the loading motor 51 is transmitted to the transfer gear 57a successively through the pulley 52 fixedly mounted on a drive shaft of the loading motor 51, a belt 53 running around the pulley 52 and the pulley 54, the speed reducing gear 55 (through large-diameter gear 55a held in mesh with a gear (not designated) co-rotatable with the pulley 54, and through the small-diameter gear 55b), the pinion gear 56a held in mesh with the gear 55b and the pinion gear 56a.

In the left transmitting system, the driving power generated by the loading motor 51 is transferred from the transfer gear 57a to a common transfer shaft 58 and then to the transfer gear 57b mounted on the transfer shaft 58 in concentric relation to the transfer gear 57a. Thereafter, the driving power is transmitting from the transfer gear 57b to the pinion gear 56b. The right and left transmitting systems operate in synchronism with each other.

The pinion gear 56a of the right transmitting system and the pinion gear 56b on the left right transmitting system are held in mesh with rack gears 31a, 31b, respectively, formed on opposite sides of the cassette tray 30. With this construction, when the pinion gears 55a, 55b are rotated, the cassette tray 30 moves back and forth (from the left to the right or vise versa in FIG. 2A).

Thus, the cassette tray 30 is slidably and reciprocally movable relatively to the bracket 20 between a first position (FIG. 3) in which the cassette tray 30 is retracted or drawn into the recording/reproducing apparatus, and a second position (FIG. 2A) in which the cassette tray 30 is ejected from the recording/reproducing apparatus.

Teeth of the pinion gears 56a, 56b (or the rack gears 31a, 31b) are partly mutilated so that meshing engagement between the pinion gears 56a, 56b and the rack gears 31a, 31b is interrupted when the cassette tray 30 arrives at the retracted first position, and further rotation of the pinion gears 56a, 56b does not cause the drive power to be transmitted from the loading motor 51 to the cassette tray 30.

The cassette tray 30 has a substantially U-shape as viewed from the above, and the rack gears 31a, 31b are formed on the bottom surfaces of the opposite sides the U-shaped cassette tray 30 for driven mesh with the pinion gears 56a, 56b. The cassette tray 30 has a vertical cover portion 32 disposed outside the rack gears 31a, 31b. The cover portion 32 has a height large enough to conceal the rack gears 31a, 31b from the user's view. The cover portion also serves as a protective cover to protect the user's finger from being drawn into the bracket 20 as the cassette tray 30 is retracted. The protective cover has a function to protect component parts from being strained by a grease which may scatter from the rack gears 31a, 31b and further to prevent dust and dirt form mixing into the grease, thereby insuring a smooth sliding movement of the cassette tray 30.

Figure 2A:
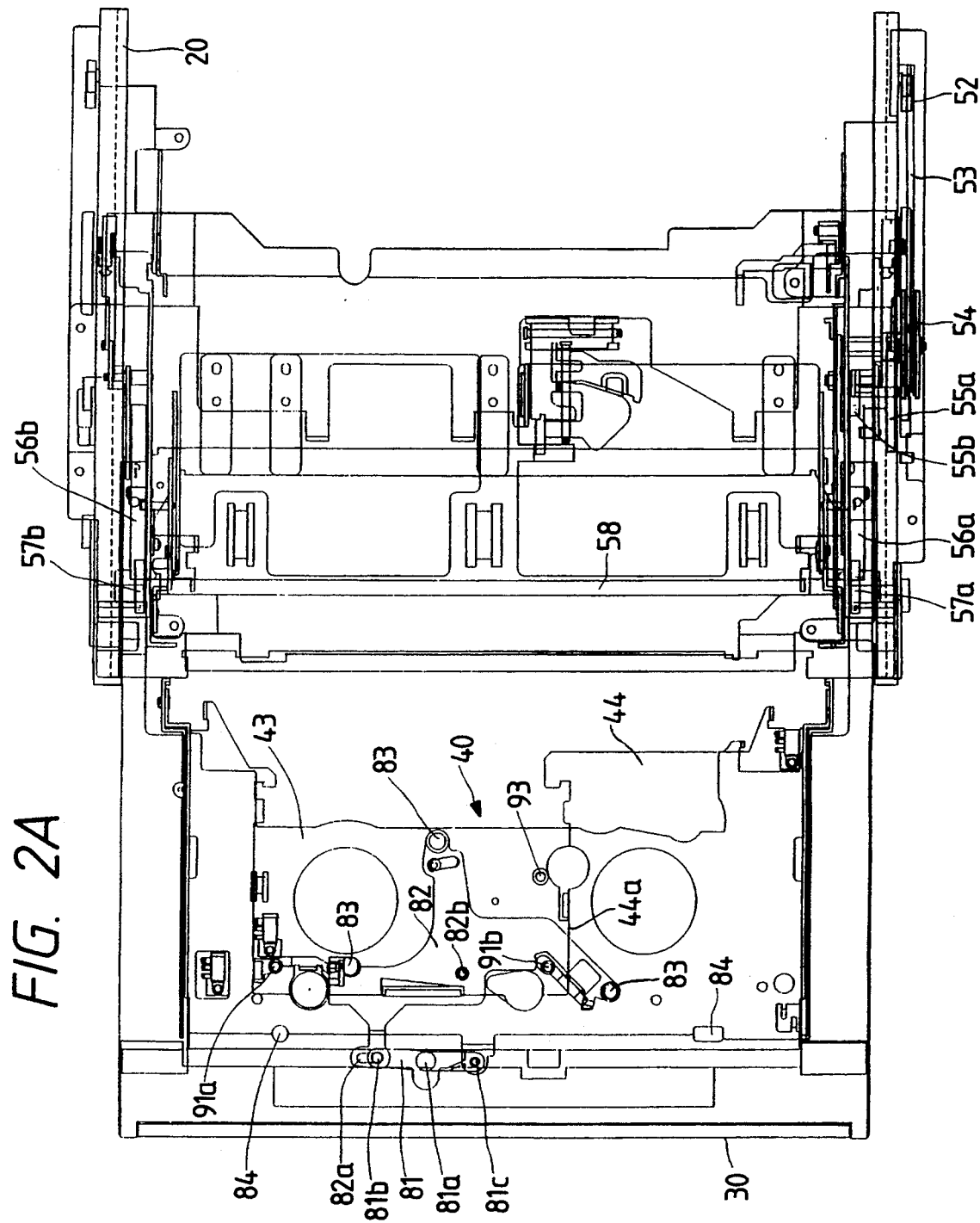
FIG. 2A is a plan view of the cassette loading device with the cassette tray ejected from a housing body.
Figure 2B:
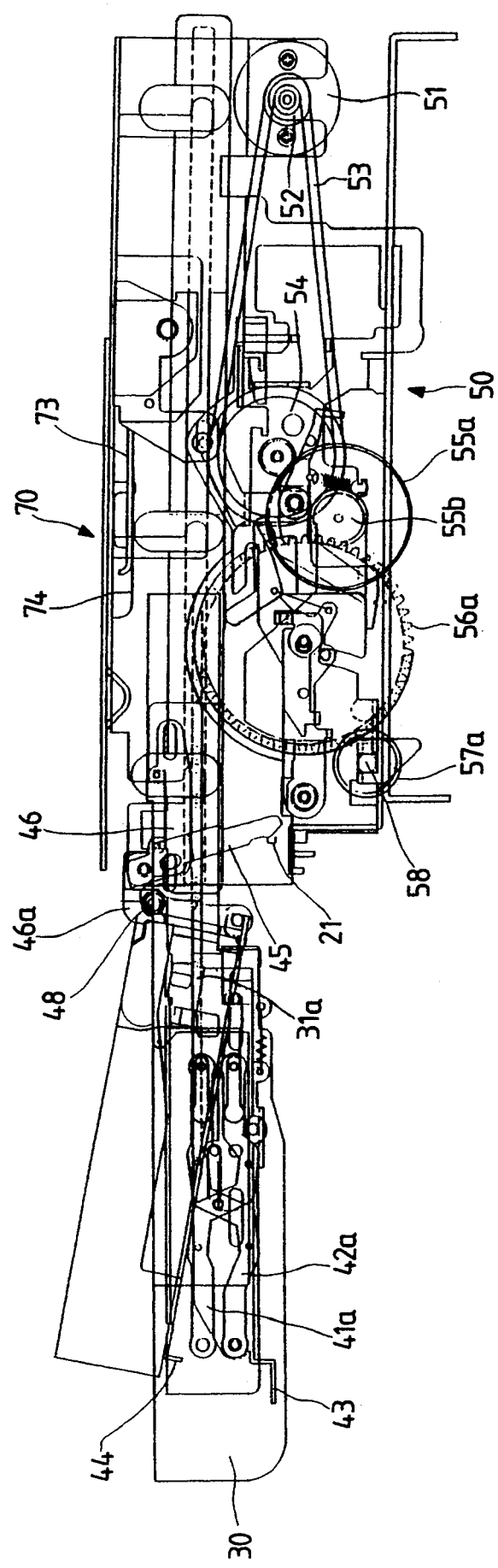
FIG. 2B is a right side view of FIG. 2A.
Figure 2C:
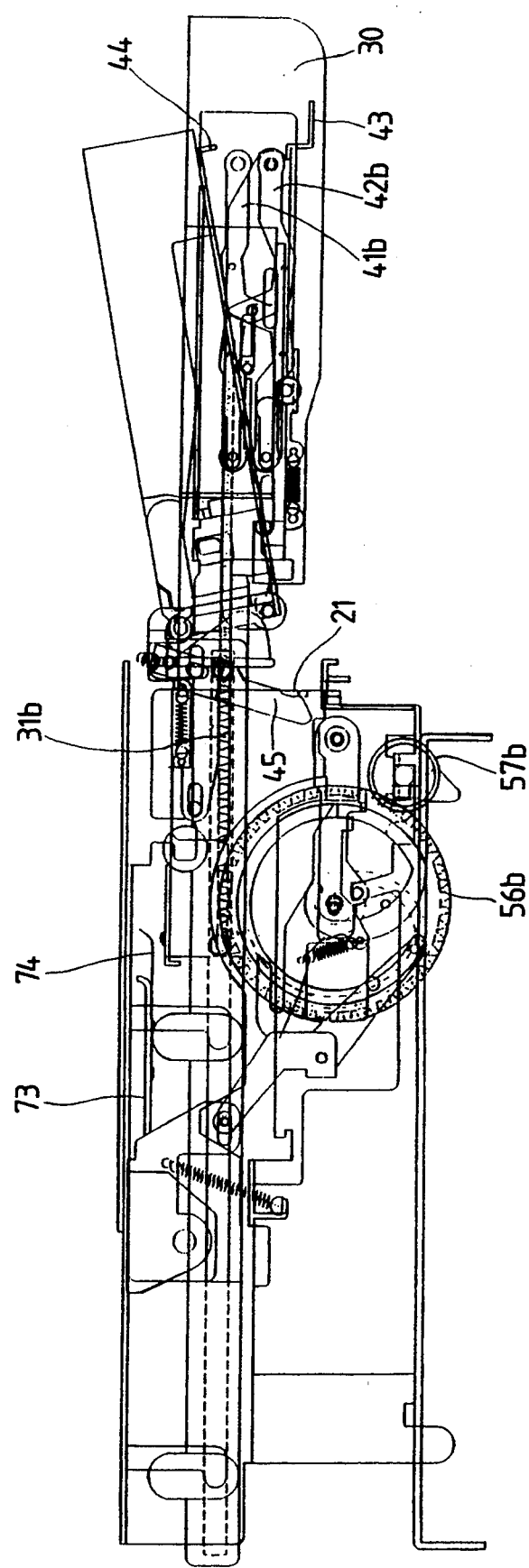
FIG. 2C is a left side view of FIG. 2A.

The holder 40, as shown in FIGS. 2B and 2C, is disposed inside the cassette tray 30 and is connected at its opposite sides to the cassette tray by two pairs of upper and lower links 41a, 42a and 41b, 42b. The holder 40 is movable in unison with the cassette tray 30 while it is received in the cassette tray 30. When a cassette is to be set on the holder 40, the holder 40 is ejected from the front panel of the body of the recording/reproducing apparatus together with the cassette body 30.

The construction of the holder 40 will be described below in greater detail with reference to FIGS. 1, 2A–2C, 6, 7 and 8A–8E. The holder 40 is composed of a lower C-holder member 43 and an upper F-holder member 44, both members 43, 44 being press-formed from a sheet metal. The F-holder member 44 has a substantially same size as the bottom surface of a standard cassette S such as VHS video cassette ("VHS" is the trademark of Victor Company of Japan, Ltd.). As shown in FIGS. 1 and 2A, the F-holder member 44 further has a substantially rectangular recess or opening 44a at a predetermined position, the opening 44a being substantially the same size as the bottom surface of a compact cassette such as VHS-C video cassette ("VHS-C" is the trademark of Victor Company of Japan, Ltd.).

Figure 8A:
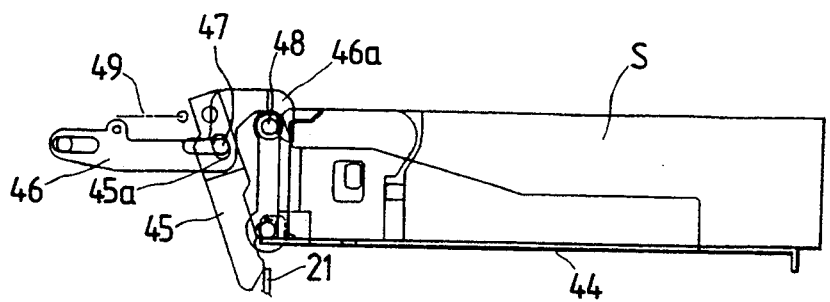
FIGS. 8A through 8E are side views illustrative of a manner in which the holder is tilted by a holder tilting mechanism.
Figure 8B:
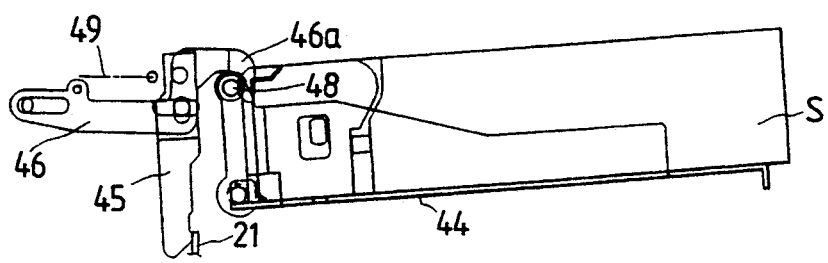
Figure 8C:
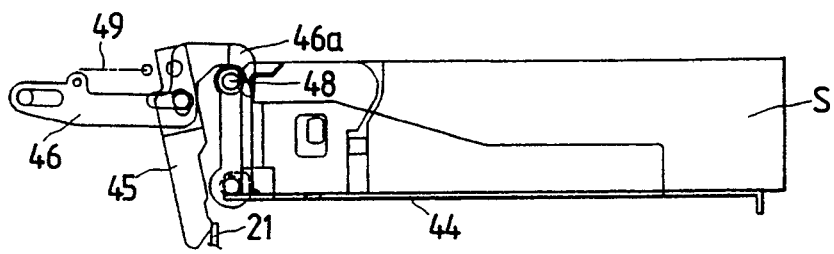
Figure 8D:
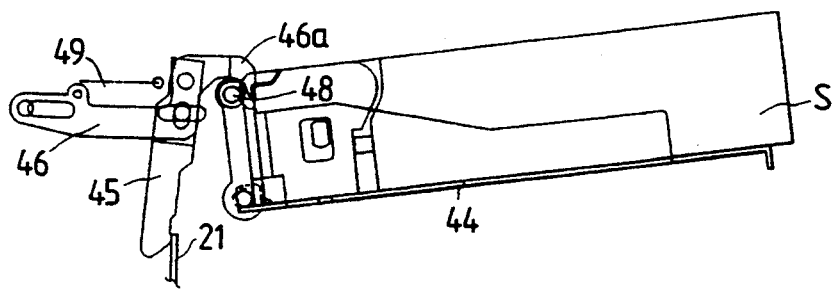
Figure 8E:
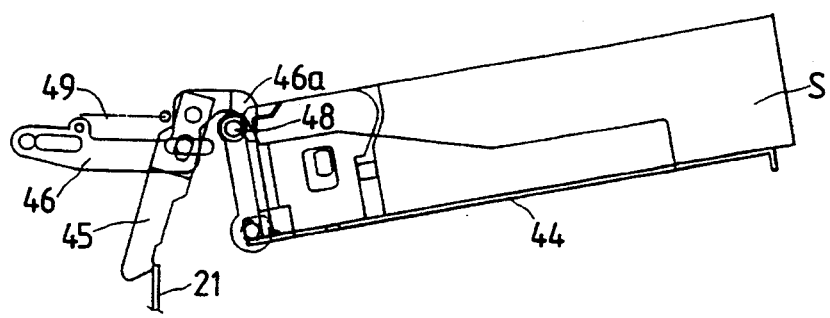

The F-holder 44 is tiltable in response to the movement of the cassette tray 30 when the cassette tray 30 is located near the second position (fully ejected position) during a forward stroke of its reciprocating movement while the cassette tray 30 is guided by a non-illustrated mechanism. The F-holder member 44 is pivotably mounted on the cassette tray 30 and is connected to a stopper 45 and a slant lever 46 slidable along the cassette tray 30. As shown in FIG. 8A, the slant lever 46 has a horizontal pin 47 projecting from an intermediate portion thereof and is urged by a tension spring to turn clockwise about the pin 47. The pin 47 is movably received in an oblong hole 45a in the stopper 45.

When the cassette tray 30 is driven in an ejecting direction toward the second position, a mechanism including the stopper 45 and the slant lever 46 moves rightward in FIGS. 8A–8E together with the holder 40. When the cassette tray 30 approaches the second position, a lower end of the stopper 20 engages an upstanding strip 21 of the bracket 20, the strip 21 constructing a fixed abutment.

As shown in FIGS. 8B through 8E, a further advancing movement of the cassette tray 30 toward the second position causes the stopper 45 to turn clockwise about a portion of engagement between the upstanding strip 21 whereupon the slant lever 46 slides in an inserting direction toward the first position as viewed from the cassette tray 30 and the F-holder member 44. In this instance, a hook portion 46a formed on an end of the slant lever 46 and held in engagement with a pin 48 on the F-holder member 44 pulls the pin 48 toward the first position, thereby causing the F-holder member 44 to tilt upward in the counterclockwise direction about the pin 48.

The pin 47 on the slant lever 46 is located between the pivot point (upstanding strip 21) of the stopper 45 and the distal end of the stopper 45. As the position of the pin 47 is displaced upwardly toward the distal end of the stopper 45, an angle of inclination of the F-holder 44 relative to the amount of movement of the cassette tray 30 toward the second position increases. If the stopper 45 is removed and the slant lever 46 is directly engaged by the upstanding strip 21 of the bracket 20, the F-holder member 44 is tilted abruptly. The stopper 45 is effective to smoothen or modulate the tilting movement of the F-holder member 44.

Attachment and detachment of the standard cassette S and the compact cassette relative to the holder 40 will be described below.

For the attachment of the standard cassette S, the holder 40 is ejected from the body of the recording/reproducing apparatus together with the cassette tray 30. Then the standard cassette S is pushed toward the apparatus body until it is placed onto the tilted F-holder member 44. When the standard cassette is to be detached, the standard cassette is pulled in a direction away from the recording/reproducing apparatus until it is removed from the F-holder member 44. The foregoing attachment and detachment operation of the standard cassette S can be achieved simply and easily by one hand of the user as in the case of a cassette housing of the front loading type.

Attachment of the compact cassette C is achieved by vertically placing the compact cassette C down into the opening 44a in the F-holder member 44 while the holder 40 is ejected together with the cassette tray 30, with the F-holder 44 kept in the tilted position. The compact cassette C thus placed is supported on the C-holder member 43 which is held in a horizontal position. In this instance, those edges of the F-holder member 44 which define the opening 44a engage the peripheral walls of the compact cassette C to hold the compact cassette C in position against displacement. When the compact cassette C is to be detached, the compact cassette C is pulled up from the opening 44a of the F-holder member 44.

Figure 9:
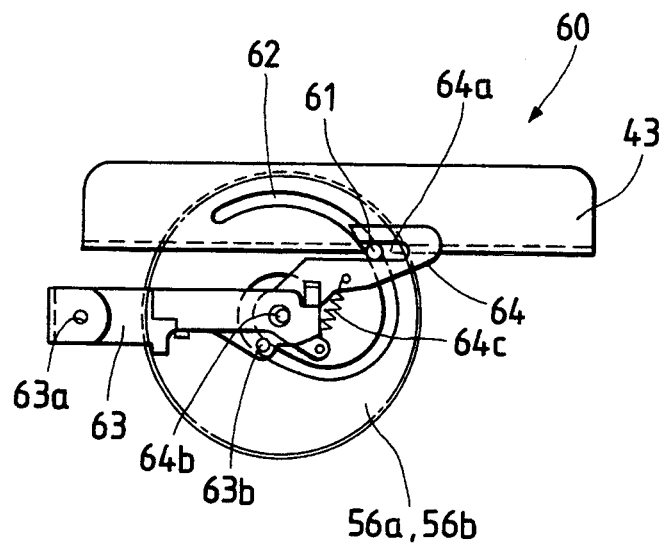
FIG. 9 is a view showing the construction of a holder lifting mechanism.
Figure 11:
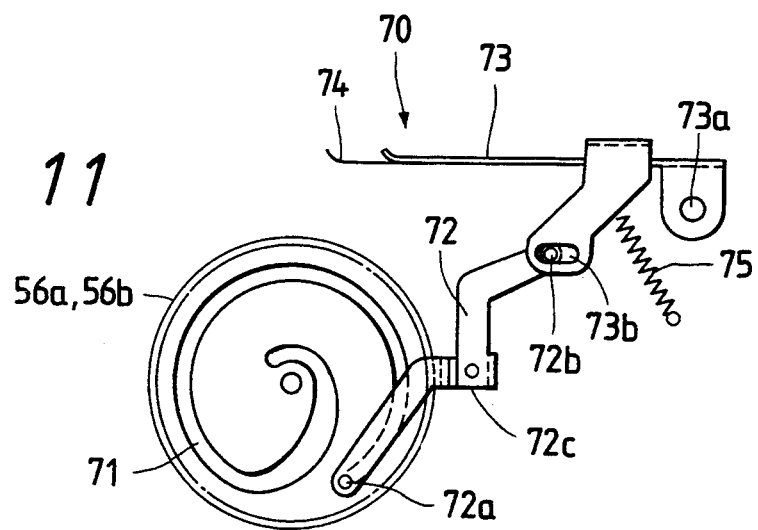
FIG. 11 is a view showing the construction of a cassette presser mechanism.

The holder lifting mechanism 60 will be described below in greater detail. As shown in FIG. 9, the movement of the cassette tray 30 from the second position to the first position causes the pin 61 on the C-holder member 43 to engage a U-shaped groove 64a in a limiter 64.

The limiter 64 is rotatably connected by a pin 64b to an arm lever 63 which is pivoted on the bracket 20 by a pin 63e. A tension coil spring 64c extends between the limiter 64 and the arm lever 63. When the pin 61 is fitted in the U-shaped groove 64a, the holder 40 is detached from the cassette tray 30 and supported by the limiter 64 and the arm lever 63.

Each of the pinion gears 56a, 56b has in its inside surface a first cam groove 62 in which a pin 63b on the arm lever 63 is received. With this arrangement, when the pinion gears 56a, 56b are rotated, the pin 63b is guided along the first cam grooves 62 of the corresponding pinion gear 56a or 56b to turn the arm lever 63 about the pin 63a, thereby causing the limiter 64 to vertically reciprocate the pin 61 on the C-holder member 43 and hence the holder 40, as shown in FIGS. 10A–10C. During that time, driving power is not transmitted to the cassette tray 30 because the pinion gears 56a, 56b are mutilated as described above.

When the C-holder member 43 is lowered to a predetermined height or level, it engages a retaining portion (not shown) of a main deck of the recording. The arm lever 63 is turned further against the force of the spring 64c, and the thus extended spring 64c urges the limiter 64 downward to thereby force the C-holder member 43 against the retaining portion.

The cassette presser mechanism 70 will be described below in greater detail with reference to FIGS. 11, 12A and 12B, and 13A and 13B. Each of the pinion gears 56a, 56b has on its outside surface a second cam groove 71 in which a pin 72a on one end of a hold lever 72 is received. The hold lever 72 is pivotally connected at its center to the bracket 20 by means of a pin 72c. A pin 72b on the opposite end of the hold lever 72 is received in an oblong hole 73b in a hold plate 73. The hold plate 73 is pivoted by a pin 73a to the bracket 20 and is urged by a tension coil spring 5 to turn in the counterclockwise direction in FIG. 11 about the pin 73a. The hold plate 73 includes a plate spring 74 extending outwardly form the distal end of the hold plate 78.

Figure 12A:
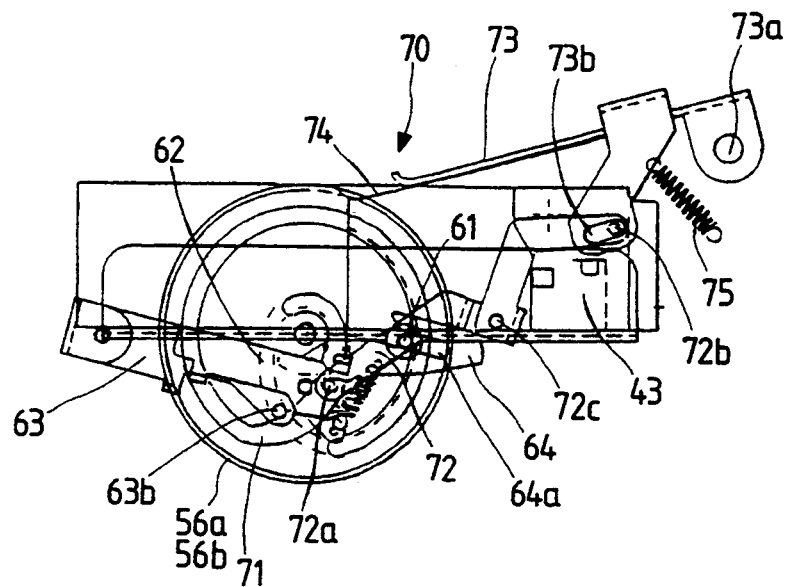
FIG. 12A and 12B are side views illustrative of a manner in which the standard cassette is depressed by the cassette presser mechanism.
Figure 12B:
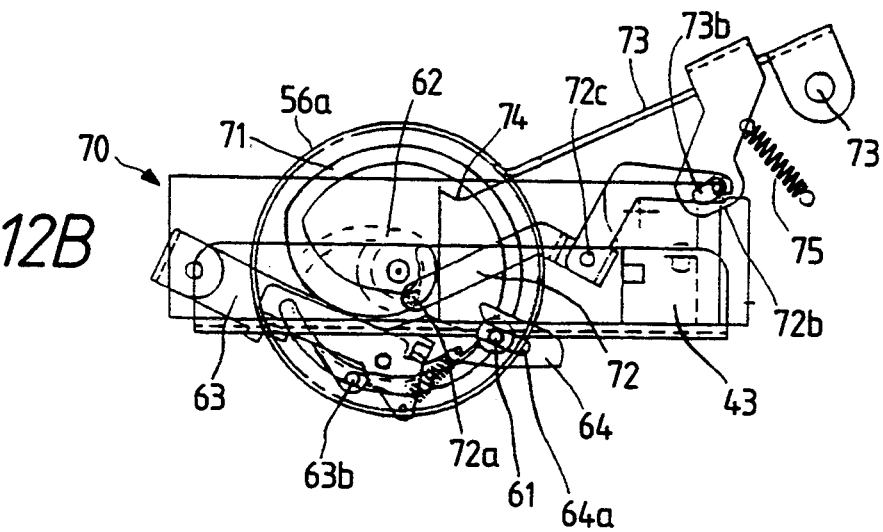
Figure 13A:
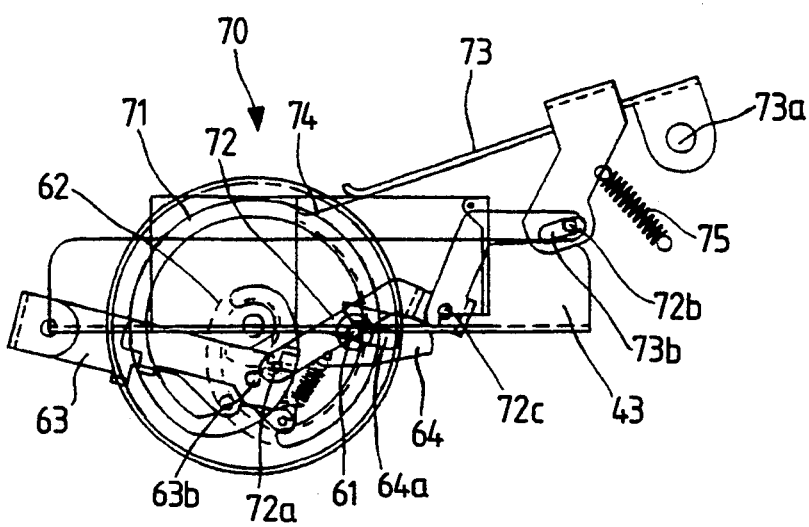
FIG. 13A and 13B are side views illustrative of a manner in which the compact cassette is depressed by the cassette presser mechanism.
Figure 13B:
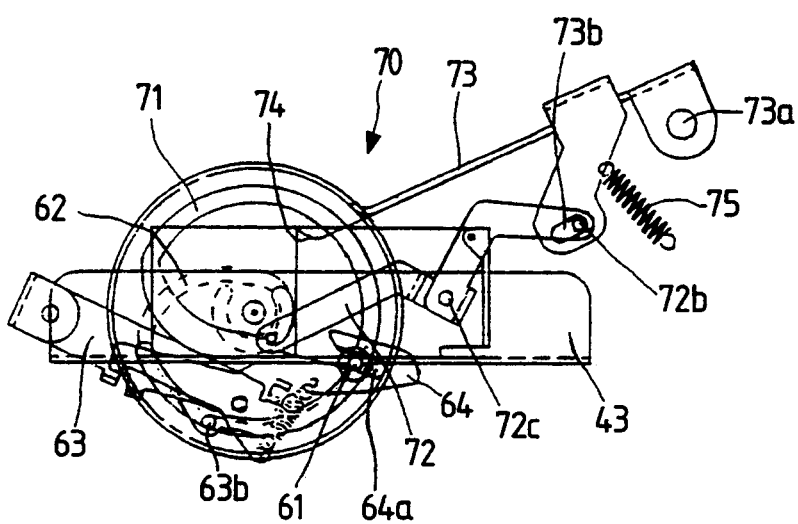

With this construction, when the pinion gears 56a, 56b are rotated in the clockwise direction, the pin 72 is guided by and along the second cam groove 71 to cause the hold lever 72 to turn about the pin 72c in the counterclockwise direction under the force of the spring 75. As a result, the plate spring 74 forces the standard cassette S against the F-holder member 44, as shown in FIGS. 12A and 12B. In the case of the compact cassette C, this compact cassette C is urged by the plate spring 74 against the C-holder member 43, as shown in FIGS. 13A and 13B. The cassettes S and C are finally pressed by the plate spring 74 of the hold plate 73. However, in order to depress the cassette during vertical movement of the holder 40, the second cam groove 71 is partly widened to enlarge a downward stroke of the hold plate 73.

The holder lifting mechanism 60 and the cassette presser mechanism 70 may be replaced by a conventional lever for vertically reciprocating the holder 40 and a plate spring connected to the distal end of the lever for forcing the cassette against the holder simultaneously with the downward movement of the holder 40. In this instance, however, the lever must be large in size and hence the overall height or thickness of the recording/reproducing apparatus is enlarged. Further, separate adjustments of the holder lifting operation and the cassette pressing operation is difficult to obtain. With the holder lifting mechanism 60 and the cassette presser mechanism 70 provided separately, it is possible to reduce the size of the cassette presser mechanism, and the timing of the holder lifting operation and the cassette pressing operation can be adjusted freely.

Then, a description is given to the holder reference-surface height adjustment mechanism 80. This mechanism is needed for the reasons described below.

Assuming that the bottom surface of each of the standard cassette C and the compact cassette C constitutes a reference surface when the cassette S or C is set in the predetermined position in the body of the recording/reproducing apparatus, the level or height of the reference surface must be changed to provide a constant tape traveling height because the standard cassette S and the compact cassette C have different thicknesses.

To this end, a reference pin for the standard cassette S and another reference pin for the compact cassette C may be provided on the main deck for being received in a reference hole in the standard cassette S and a reference hole in the compact cassette C, respectively, when the corresponding cassette S or C is loaded. In this instance, these pins have different heights so that when either cassette S or C is mounted, the reference surface of the mounted cassette can be kept at a desired height. However, since the reference pin for the compact cassette C is located in an area occupied by the standard cassette S when the latter is mounted, it is necessary to retract this reference pin to a position so as to enable the standard cassette S to be mounted without interference with the same reference pin. A separate mechanism is therefore needed for retracting the reference pin for the compact cassette. Furthermore, the overall thickness of the recording/reproducing apparatus is enlarged and a compact apparatus is difficult to obtain.

The holder reference-surface height adjustment mechanism 80 is provided in view of the foregoing difficulties. As shown in FIGS. 2A, 3 and 14–16, this mechanism includes a horizontal select lever 81 pivotally connected to a rear end portion (located on the front panel side) of the C-holder member 43 of the holder 40. The select lever 81 includes an upstanding projection 81a disposed at an intermediate portion thereof and engageable with a rear end wall of the standard cassette S, the projection 81a having a tapered guide surface 81a' for guiding engagement with the rear end edge of the standard cassette S. The select lever 81 has a pin 81b on one end and is pivoted at its opposite end to the rear end portion of the C-holder member 43 for rotation about a pivot axis 81c. A slider 82 is movably mounted on the bottom of the C-holder member 43. The slider 82 has an oblong hole 82a slidably receiving therein the pin 81b and is pivotally movable in response to the pivotal movement of the select lever 81.

Figure 16:
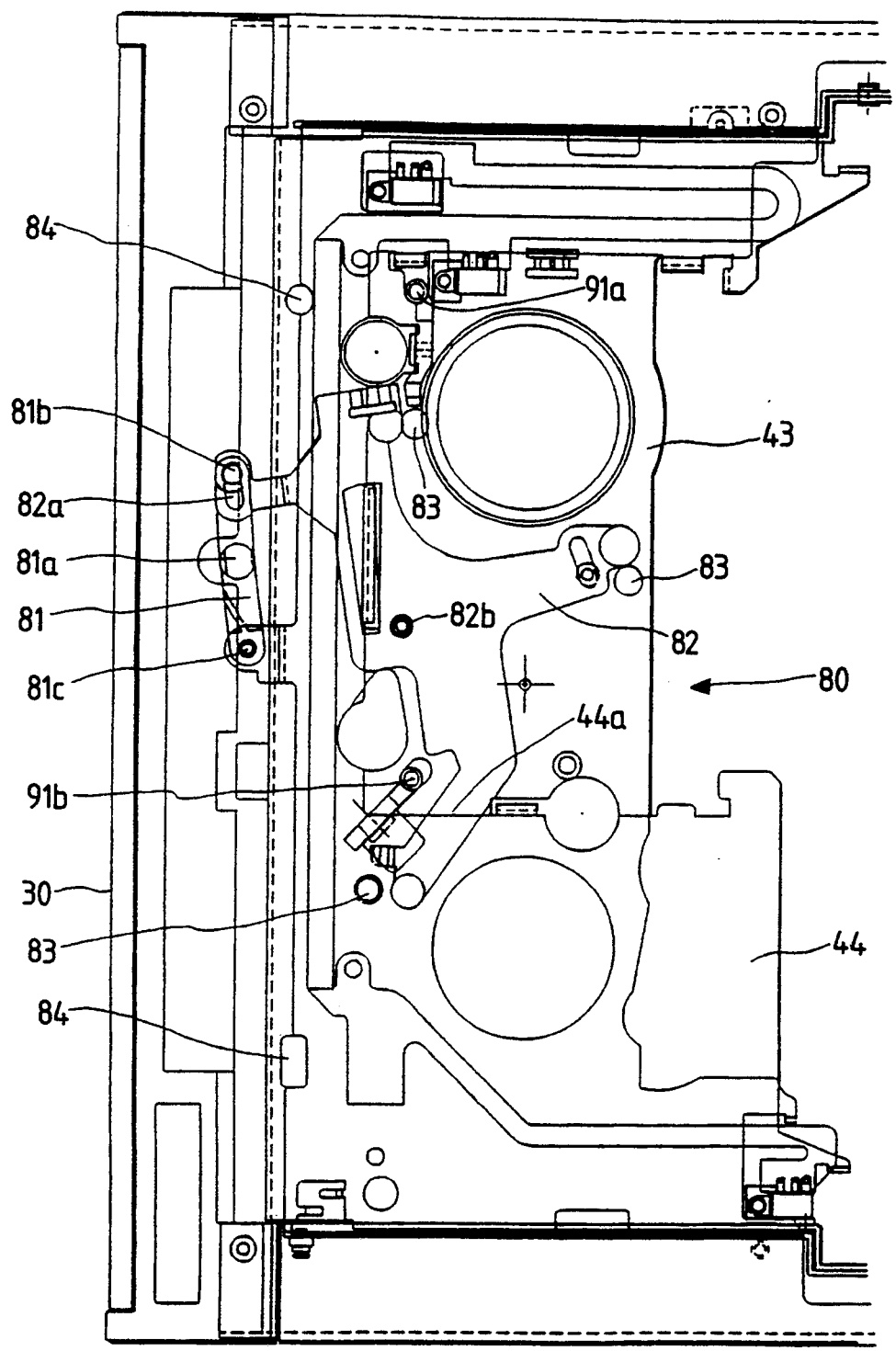
FIG. 16 is a plan view illustrative of the operation of a slider.

As shown in FIG. 16, the C-holder member 43 has a predetermined number of first holes 83 (three in the illustrated embodiments), and a plurality of second holes 84 (two in the illustrated embodiment). The first holes 83 are adapted to be closed by the slider 82 when the slider 82 is disposed in an inoperative position and they are opened when the slider 82 is pivoted. The second holes 84 are always opened irrespective of the pivotal movement of the slider 82 and are receptive of reference pins for the standard cassette S. The slider 82 is normally urged by a spring (not shown) in a direction to close the first holes 83. Slider retaining pins 85 are disposed on the main deck at positions corresponding to the positions of the respective first holes 83. F-reference pins 86 are disposed on the main deck and aligned with the corresponding second holes 84. The F-reference pins 86 are receivable in reference holes in the standard cassette S to control the vertical position of the standard cassette S.

Figure 14:
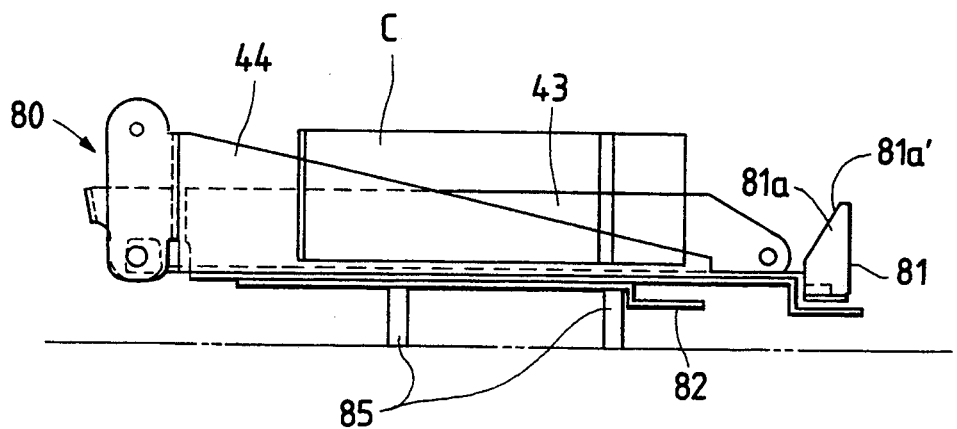
FIG. 14 is a side view showing a holder reference-surface height adjustment mechanism when used with the compact cassette.

When the compact cassette C is mounted, the upstanding projection 81a on the select lever 81 is out of engagement with the compact cassette C as shown in FIG. 14. The slider 82 is, therefore, not pivoted at all and hence the first holes 83 of the C-holder member 43 are closed as shown in FIGS. 2A and 3. In this instance, the upper surfaces of the respective slider retaining pins 85 abut against the under surface of the slider 82. Thus, the compact cassette C is held in a desired level with the agency of the slider 82 and the C-holder member 43.

Figure 15:
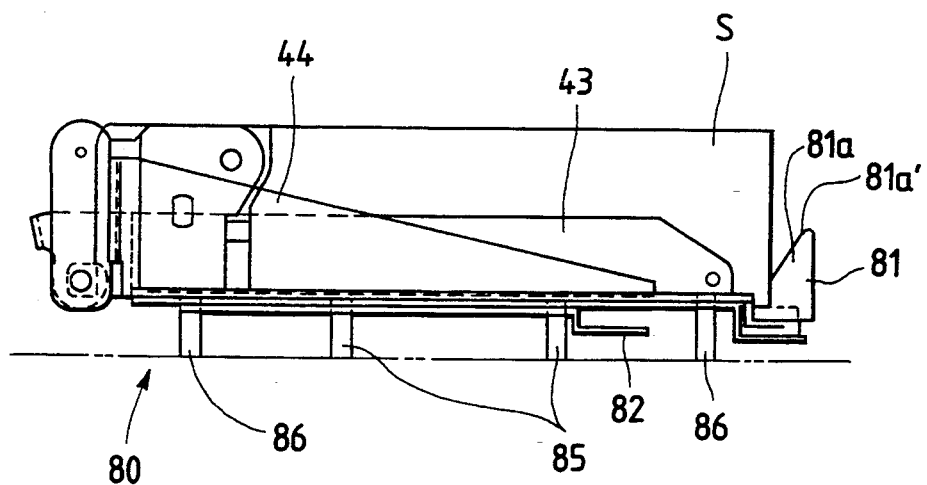
FIG. 15 is a side view showing the holder reference-surface height adjustment mechanism when used with the standard cassette.

When the standard cassette S is mounted on the holder 40, the rear end wall of the standard cassette S engages the upstanding projection 81a and then urges the latter in a direction to pivot the select lever 81 in the counterclockwise direction in FIG. 16 about the pivot axis 81c. In response to this pivotal movement of the select lever 81, the slider 82 turns in the counterclockwise direction about the pivot axis 82b to thereby open the first holes in the C-holder member 43. When the holder 40 is loaded in the predetermined position as shown in FIG. 15, the slider retaining pins 85 are received in the corresponding first holes 83 to thereby allow the holder 40 to move downward to a position lower than the position assumed by the holder carrying thereon the compact cassette C. Consequently, the standard cassette S is brought into contact with F-reference pins 86 and the standard cassette S can be held in a desired level.

When the standard cassette S is loaded, the F-reference pins 86 are brought into direct engagement with the reference holes in the bottom wall of the standard cassette S for positioning the standard cassette S in a desired level. On the other hand, in case of the loading of the compact cassette C, the slider retaining pins 85 engage the slider 82 disposed below the holder 40, however, the compact cassette C is not restricted per se. A mechanism for positioning the compact cassette C relative to the main deck is, therefore, needed.

Figure 17A:
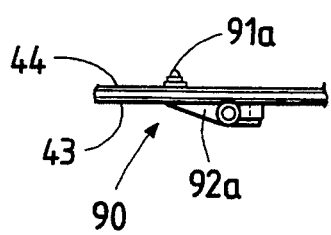
FIG. 17A is a view illustrative of the operation of a reference pin of a positioning mechanism when used with the standard cassette.
Figure 17B:
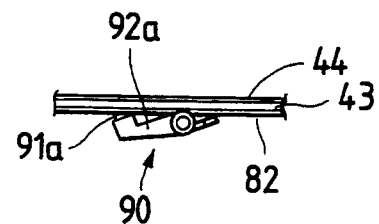
FIG. 17B is a view illustrative of the operation of the reference pin of the positioning mechanism when used with the compact cassette.
Figure 18:
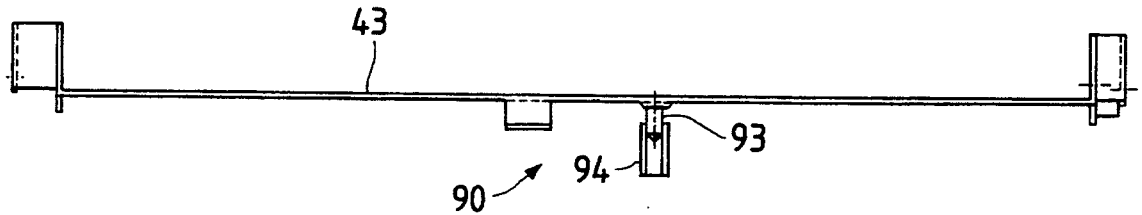
FIGS. 18 and 19 are views illustrative of the operation of a stud of the holder relative to the positioning mechanism.
Figure 19:
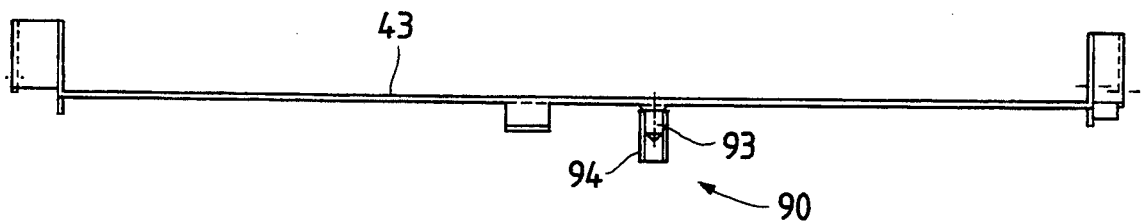

The compact cassette positioning mechanism 90, as shown in FIGS. 2A and 16, includes a plurality (two in the illustrated embodiment) of C-reference pins 91a, 91b engageable with reference holes of the compact cassette C. As shown in FIGS. 17A and 17B, each of the C-reference pins 91a, 91b (only the pin 91a being shown) is disposed on the distal end of a pivotable support member 92a, 92b (FIG. 3) normally urged by a spring (not shown) to turn in a direction to move the C-reference pins 91a, 91b upward. The C-reference pins 91a, 91b are vertically movable. The positioning mechanism 90 further includes, as shown in FIGS. 3, 18 and 19, a stud 93 projecting downwardly from the under surface of the C-holder member 43 at a substantially central portion thereof, and an engagement hole 94 (defined by a tubular stud) disposed on the main deck at a position which is aligned with the position of the stud 93 when the holder 40 is loaded in the predetermined position.

When the compact cassette C is mounted on the C-holder member 43 through the opening 44a in the F-holder member 44, the reference holes in the compact cassette C are fitted with the C-reference pins 91a, 91b as shown in FIG. 17A. Thus, the compact cassette C is positioned jointly by the C-reference pins 91a, 91b and the openings 44a in the F-holder member 44. After the F-holder 44 is moved to the horizontal position, the C-reference pins 91a, 91b keep the compact cassette C in position against horizontal displacement. Subsequently, the holder 40 is disposed to the loading position whereupon the stud 93 is fitted in the engagement hole 94 of the main deck, thereby positioning the holder 40 relative to the main deck. As a result of this positioning of the holder 40, the compact cassette C is also positioned relative to the main deck.

When the standard cassette S is mounted, the C-reference pins 91a, 91b on the C-holder member 43 are lowered by the weight of the standard cassette S and hence do not hinder smooth mounting of the standard cassette S.

FIGS. 20A–20D, 21A–21C and 22A–22C illustrative a cassette loading device according to a second embodiment of the present invention. The cassette loading device is structurally similar to the cassette loading device of the first embodiment described above but differs therefrom in that a pivotable cassette holder is provided for exclusive use with a standard cassette. Due to the structural similarity, a description will be given only to a point of difference.

The cassette loading device includes a holder 400 pivotally connected by pins A (FIGS. 20B and 20C) to two upper links 410a, 410b pivoted to opposite sides of a cassette tray 300. The holder 400 is also pivoted by pins C to two lower links 420a, 420b pivoted on the opposite sides of the cassette tray 300 and disposed below the upper links 410a, 410b, respectively. The upper links 410a, 410b have oblong holes 411a, 411b slidably receiving therein the pins A so that the holder 400 is pivotally movable about the pins C within a limited angular range.

A pair of elongate slide plates 500 is disposed on the opposite sides of the cassette tray 300. Each of the slide plates 500 has a rack gear 501 (FIG. 21A) extending longitudinally thereof, and a cam projection 502 (FIG. 21A) engageable with the corresponding pin A of the holder 400. The slide plates 500 supports the holder 400 on a lower side of the pins A to prevent the holder 400 from moving in a downward direction beyond the slide plates 500 as the holder 400 moves downward. When the holder 400 is fully retracted, the holder 400 is released from the slide plates 500 and allowed to move downward.

Left and right pinion gears 560a, 560b (FIGS. 20A and 20B) each have a first pinion 561a, 561b meshing with one of the rack gears 310 attached to the cassette tray 300, and a second pinion 562a, 562b meshing with one of the rack gears 501 attached to the slide plates 500. The number of teeth of the first pinions 561a, 562b is different to the number of teeth of the second pinions 562a, 562b so that the slide plates 500 are moved at a speed slower than the speed of movement of the cassette tray 300 when the cassette tray 300 is ejected from the body of the recording/reproducing apparatus.

Figure 21A:
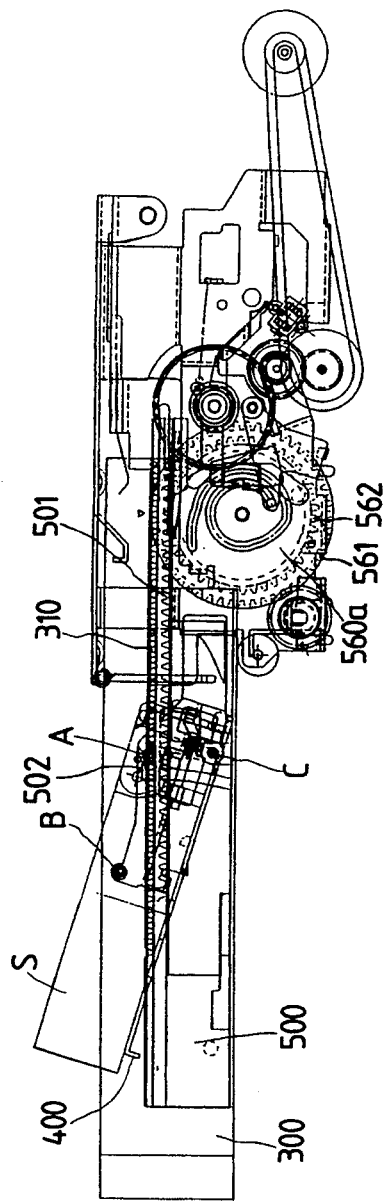
FIGS. 21A through 21C are side views illustrative of a manner in which a holder is moved between a tilted position and a horizontal position.
Figure 21B:
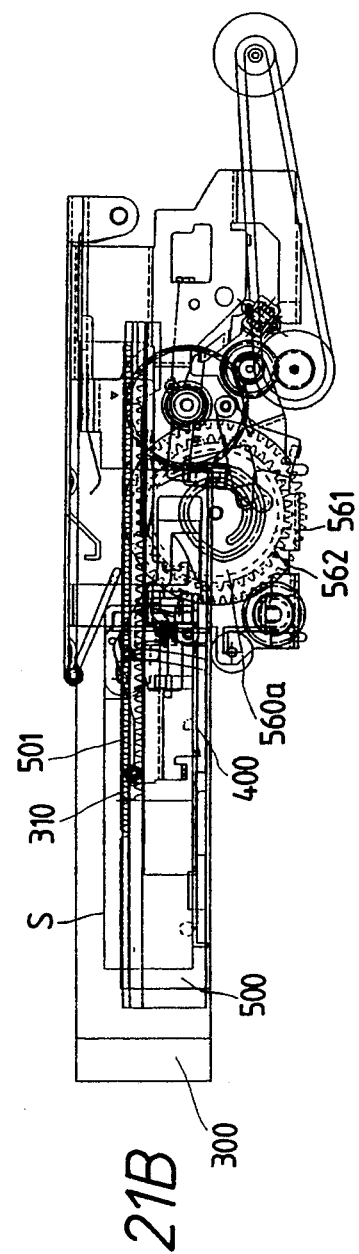
Figure 21C:
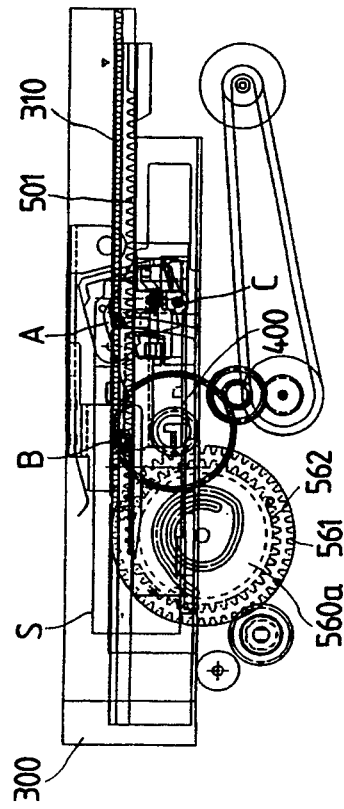

When the pinion gears 560a, 560b are rotated, the slide plates 500 are ejected forwardly together with the cassette tray 300. Since the movement of the slide plates 500 is slower than the movement of the cassette tray 300 due to the difference in number of the teeth of the first pinions 561a, 561b and the teeth of the second pinions 562a, 562b the pins A on the holder 400 engage the cam projections 502 on the respective slide plates 500 as the cassette tray 300 approaches the second position, as shown in FIG. 21A. A further advancing movement of the holder 400, the pins A are pulled rightward by the cam projections 502, thereby causing the holder 400 to turn clockwise about the pins C. Thus the holder 400 is tilted upwardly.

Figure 22A:
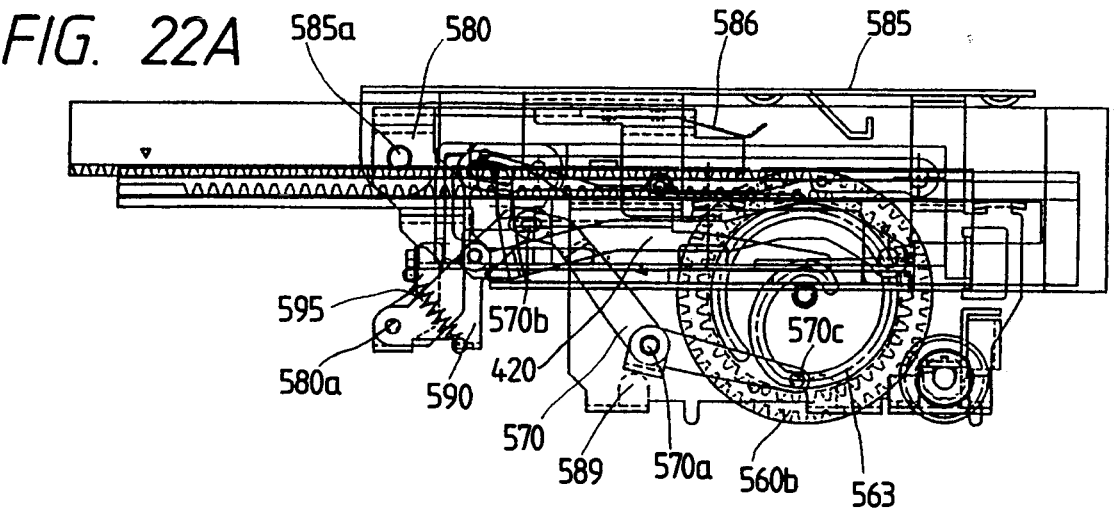
FIGS. 22A through 22C are views illustrative of a manner in which the holder is vertically moved.
Figure 22B:
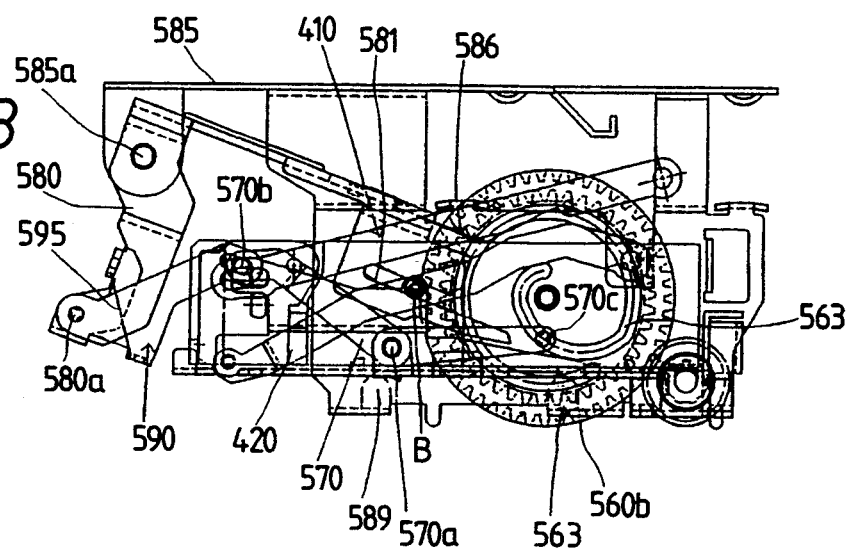
Figure 22C:
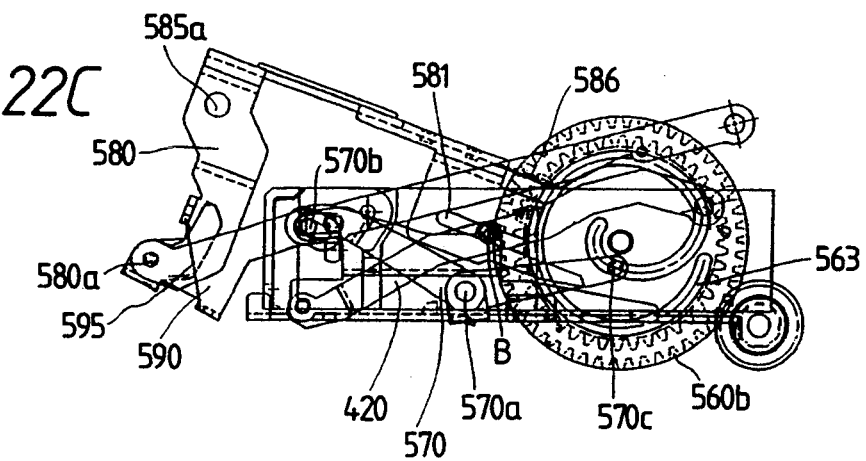

As shown in FIGS. 22A–22C, the pinion gear 560b has a cam groove 563 in which a pin 570c is slidably received. The pin 570c is disposed on one end of the hold lever 570 which is pivoted at its central portion to a bracket 585 by means of a pin 570a, the opposite end of the hold lever 570 being pivoted by a pin 570b to a limiter 590. The limiter 590 is pivotally mounted on a hold plate 580 by means of a pin 580a. The hold plate 580 is pivoted at its one end to the bracket 585 by a pin 585a. A plate spring 586 is fixed to the distal end of the hold plate 580 for forcing the cassette against the holder 400. Though not shown in FIGS. 22A–22C, the pinion gear 560a shown in FIGS. 21A–21C and its related parts have the same construction as those shown in FIGS. 22A–22C.

When the pinion gear 560b is rotated in the counterclockwise direction on FIG. 22A, the pin 570c is guided by and along the cam groove 563 to turn the hold lever 570 about the pin 570a in the counterclockwise direction. In this instance, the pinion gear 560a is also rotated in the same direction as the pinion gear 560b. When the holder 400 moves into the bracket 585, each of the pins B engages in a U-shaped groove 581 formed in each of the hold plates 580. Accordingly, in response to the rotation of the hold lever 570 in the counterclockwise direction, the hold plate 580 turns clockwise about the pin 585a to thereby lower the pin B and the holder 400. In this instance, since the holder 400 is coupled with the cassette tray 300 by means of the upper and lower links 410a, 410b, 420a, 420b respectively, the holder 400 moves vertically downwardly while holding its horizontal posture.

A spring 595 extends between the hold plate 580 and the limiter 590 and acts between them in such a manner that when the limiter 590 turns clockwise after the holder 400 is held on a retainer 589 at its lowermost position, the holder 400 is urged by the force of the spring 595 in a direction to force the holder 400 against the retainer 589. The cassette is held by the plate spring 586 secured to the hold plate 580.

FIGS. 23A–23E and 24A–24D show a cassette loading device according to a third embodiment of the invention which is similar to the second embodiment described above but differs therefrom in a system for driving a cassette tray.

Figure 23A:
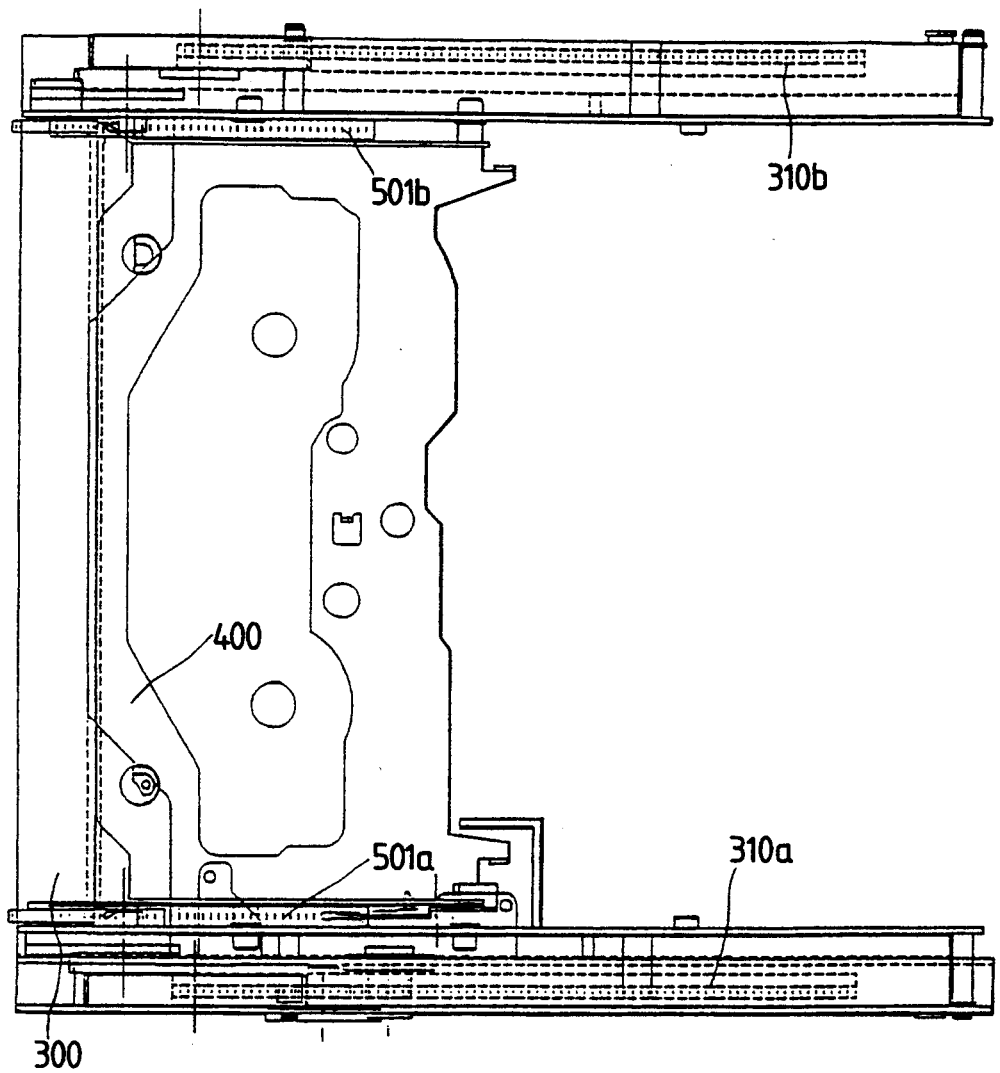
FIG. 23A is a plan view of a cassette loading device according to a further embodiment of the invention, showing a cassette tray drawn in a housing body.
Figure 23B:
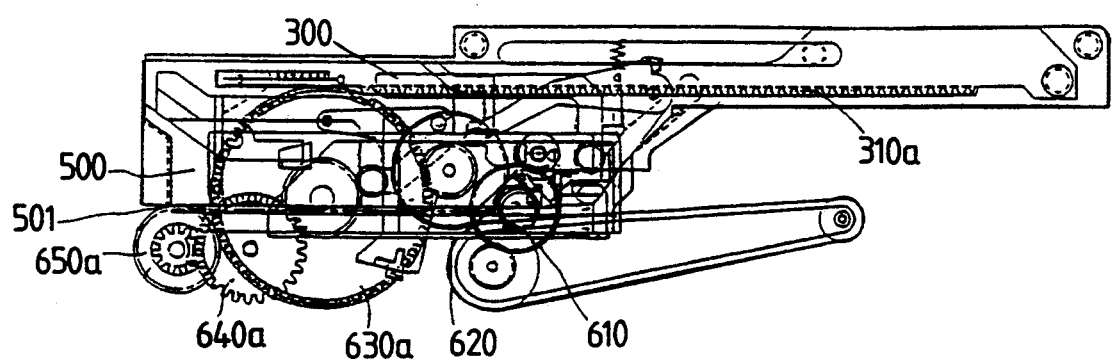
FIG. 23B is a right side view of FIG. 23A.
Figure 23C:
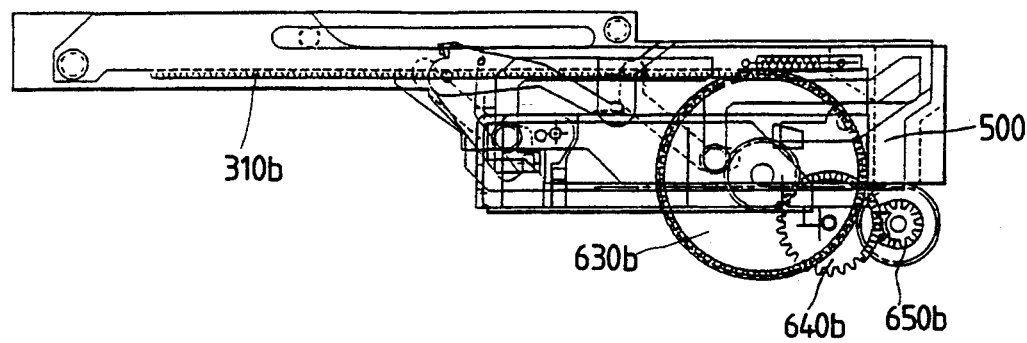
FIG. 23C is a left side view of FIG. 23A.
Figure 23D:
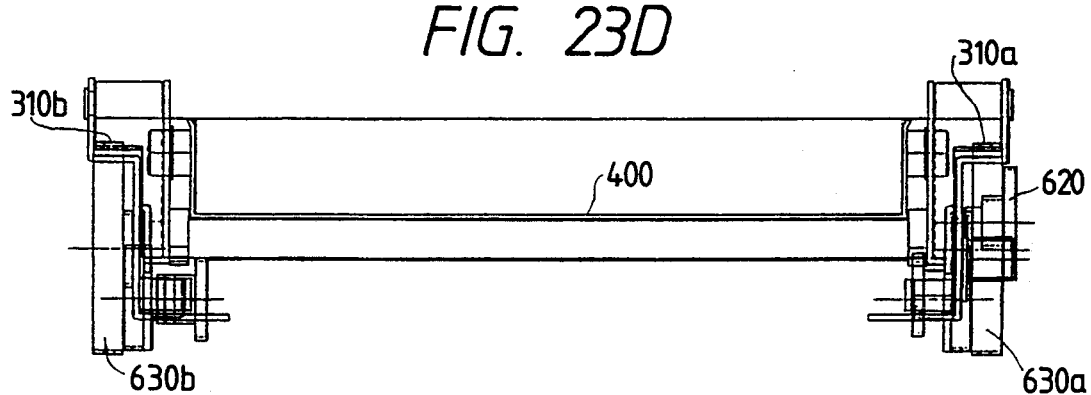
FIG. 23D is a front elevational view of FIG. 23A.
Figure 23E:
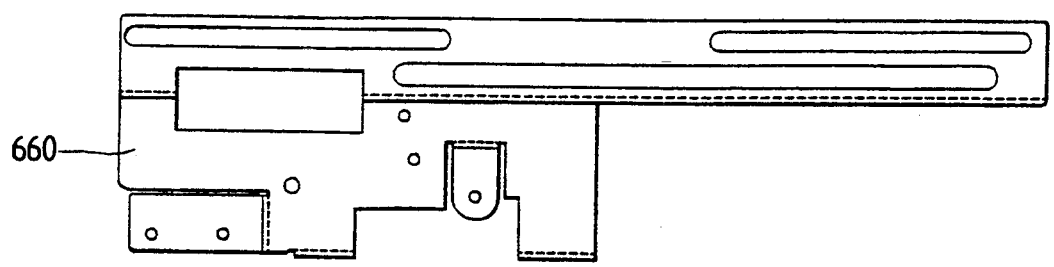
FIG. 23E is a side view of a side bracket of the cassette loading device shown in FIG. 23A.
Figure 24A:
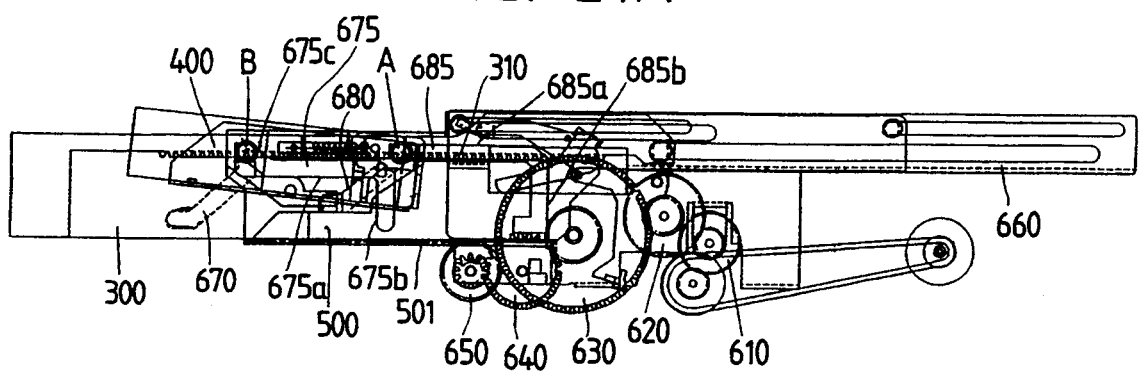
FIGS. 24A through 24D are side views illustrative of the operation of the cassette tray of the cassette loading device shown in FIG. 23A.
Figure 24B:
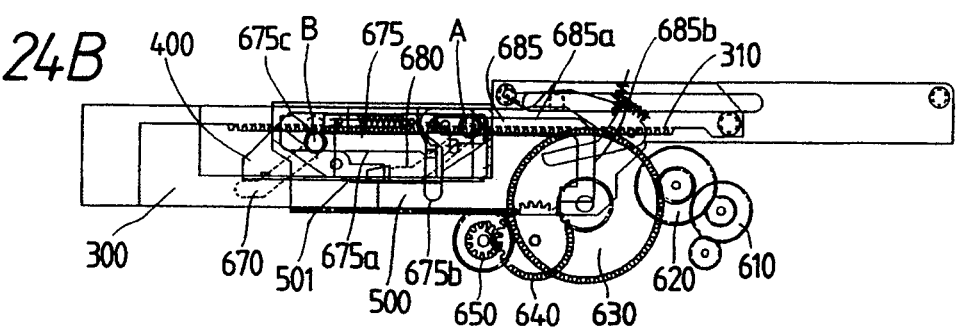
Figure 24C:
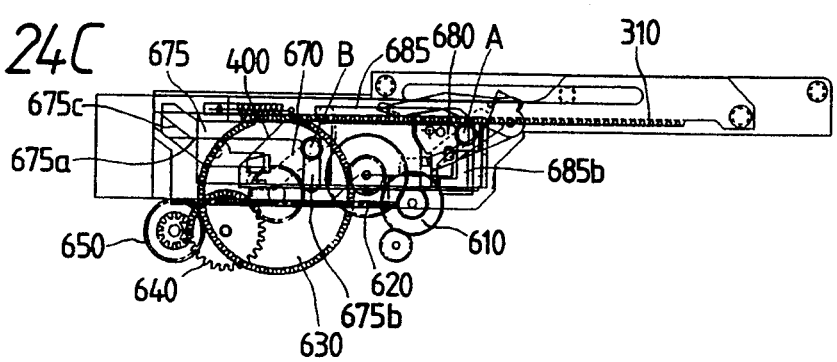
Figure 24D:
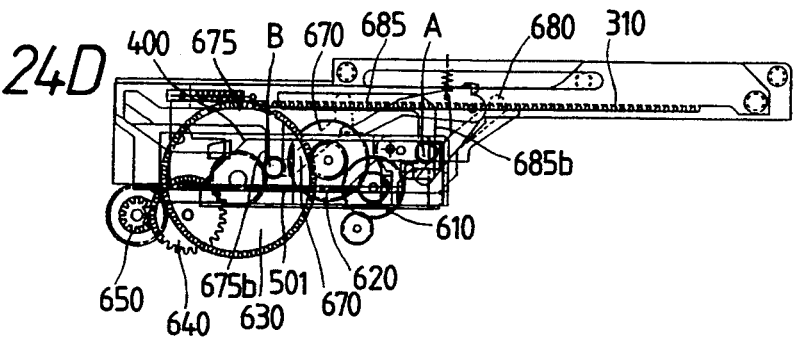
Figure 25:
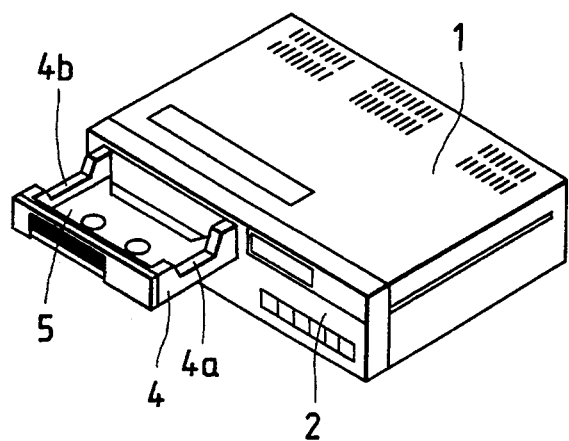
FIG. 25 is a perspective view of a known cassette loading device with a cassette tray ejected from the body of a recording/reproducing apparatus.
Figure 26:
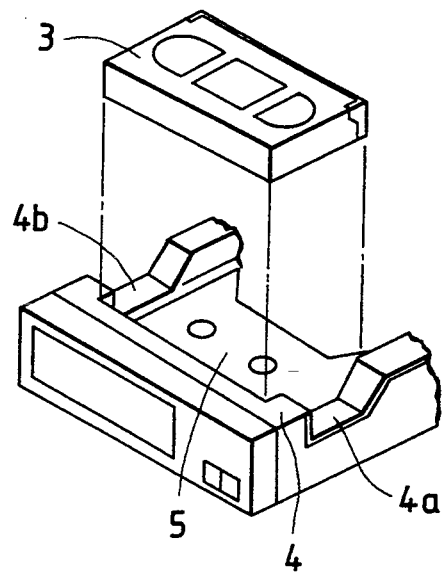
FIG. 26 is a perspective view of the known cassette loading device.

As shown in FIGS. 23A–23E, the cassette loading device includes a holder 400 (FIGS. 23A and 23B) held by a cassette tray 300 (FIG. 23B) and two opposed slide plates 500 (FIGS. 23B and 23C). The cassette tray 300 and the slide plates 500 are supported by a side bracket 660. A rotational force or power of a motor (not shown) is transmitted through a train of gears 610, 620 (FIG. 23B) to pinion gears 630a, 630b which are held in mesh with racks 310a, 310b secured to opposite sides of the cassette tray 300, as shown in FIGS. 23B and 23C). Thus, rotation of the pinion gears 630a, 630b causes the racks 310a, 310b to reciprocate the cassette tray 300. Each of the slide plates 500 has a rack 501 meshing with a pinion of a pinion gear 650a or 650b. The pinion gear 650a, 650b are connected in driven relation to the pinion gears 630a, 630b through connecting gears 640a, 640b. Thus the slide plates 500 are driven by the racks 501a, 501b in response to the rotation of the pinion gears 630a, 630b. The number of teeth of the pinion gears 650a, 650b is determined such that the slide plates 500 move at a speed slower than the speed of movement of the cassette tray 300. The pinion gear 630a, the rack 310a, the pinion gear 650a and the rack 501a jointly constitutes a left transmitting system. The pinion gear 630b, the rack 310b, the pinion gear 650b and the rack 501b jointly constitute a right transmitting system. The left and right transmitting systems are operationally synchronized by the connecting gears 640a, 640b.

As shown in FIGS. 24A–24D, the cassette tray 300 has two cam grooves 670, 680 on each side thereof, and each of the slide plates 500 has two cam grooves 675, 685. Each pin B on the holder 400 is received in the cam grooves 670 and 675, while each pin A on the holder 400 is received in the cam grooves 680 and 685. The cam grooves 670, 680 are inclined upwardly and rearward (from the left to the right in FIGS. 24A–24D). The cam groove 685 has an inverted L shape and includes a horizontal portion 685a and a vertical portion 685b. The cam groove 675 is disposed forwardly (leftward in the same figures) of the cam groove 685 and has a substantially inverted L shape including a horizontal portion 675a, a vertical portion 675b extending from one end of the horizontal portion 675a, and an inclined portion 675c extending upwardly and forwardly (leftward in the same figures) from the opposite end of the horizontal portion 675a.

When the cassette tray 300 and the slide plates 500 are ejected forwardly (leftward in FIGS. 24A–24D), the slide plate 500 moves at a speed slower than the speed of movement of the cassette tray 300 as described above. With this speed difference, as the cassette tray 300 approaches the second position, a right side wall of each cam groove 670 urges the corresponding pin B on the holder 400 to advance upwardly along the inclined portion 675c of the cam groove 675. Since such inclined portion 675c is not formed in the cam groove 685, the holder 400 is tilted upwardly about the pins A.

When the cassette tray 300 and the slide plates 500 are moved backward (rightward in FIGS. 24A–24D), left side walls of the cam grooves 670, 680 force the pins A and B to advance along the horizontal portions 675a, 685a of the respective cam grooves 675, 685. When the cassette tray 300 and the slide plates 500 are retracted to a predetermined position, a mutilated portion of each pinion gear 650 confronts the corresponding rack 501 (or a mutilated portion of each rack 501 confronts the corresponding pinion gear 650) whereupon transmission of the driving force between the pinion gears 650 and the racks 501 is terminated. Thus, the slide plates 500 stop at this position and a further rightward movement of the slide plates 500 does not take place. On the other hand, the cassette tray 300 is continuously retracted so that the pins B and A slide down along the vertical portions 675b, 685b of the respective cam grooves 675, 685 until they arrive at a predetermined position where a mutilated portion of each pinion gear 630 confronts the corresponding rack 310 (or a mutilated portion of each rack 310 confronts the corresponding pinion gear 630). Thus, the retracting movement of the cassette tray 300 is terminated.

Obviously various minor changes and modifications of the present invention are possible in the light of the above teaching. It is therefore to be understood that within the scope of the appended claims the invention may be practices otherwise than as specifically described.

What is claimed is:

1. A cassette loading device for a cassette recording-/reproducing apparatus including a body having a front panel, comprising:

a cassette tray displaceable in a horizontal direction and reciprocally movable between a first position in which said cassette tray is retracted into the body of the recording/reproducing apparatus for loading a cassette in a predetermined position, and a second position in which said cassette tray is ejected forwardly from the front panel of the body for attachment and detachment of the cassette relative to said cassette tray;

a holder disposed in said cassette tray for holding the cassette, said cassette being one of a first cassette and a second cassette which is smaller in size than said first cassette, said holder including a first holder member for supporting thereon the first cassette and a second holder member disposed below said first holder member for supporting thereon the second cassette, said first holder member having an opening complementary in contour to the shape of the second cassette and receptive of the second cassette for guiding the second cassette when the second cassette is disposed on said second holder member, said second holder member being horizontal, said first holder member having a rearward end pivoted to a rearward end of said second holder member, said first holder member being tiltable with respect to said second holder member and said cassette tray in response to the movement of said cassette tray between said first and second positions, the second holder member being pivotally stationary when the first holder member pivotally tilts;

means responsive to the movement of said cassette tray toward said second position for causing said first holder member to tilt up relative to said second holder member and said cassette tray, with a forward end of said first holder member directed upwardly;

said cassette tray including at least one slide plate movable along with said cassette tray at a speed which is different from the speed of movement of said cassette tray, said slide plate being engageable with said first holder member to progressively tilt the latter about a rearward end thereof due to a difference between the amount of movement of said slide plate as said cassette tray approaches said second position.

2. A cassette loading device according to claim 1, wherein said first holder member has a pin, said slide plate having a projection disposed below said pin and engageable with the latter to urge said first holder member to tilt up about said rearward end, said pin and said projection constituting said causing means.

3. A cassette loading device according to claim 1, wherein said first holder member has a first pin and a second pin located forwardly of said first pin, said slide plate having a first groove receiving therein said first pin and including a horizontal portion, and a second groove receiving therein said second pin and including a horizontal portion and an inclined portion extending upwardly and forwardly from said horizontal portion for guiding said second pin therealong to urge said first holder member to tilt up about said first pin, said first and second pins and said first and second grooves constituting said causing means.

4. A cassette loading device according to claim 1, further including means for driving said cassette tray and said slide plate at different speeds, said driving means including a first rack gear attached to said cassette tray, a first pinion gear meshing with said first rack gear and rotatable to reciprocate said first rack gear at a first speed, a second rack gear attached to said slide plate and a second pinion gear meshing with said second rack gear and rotatable to reciprocate said second rack gear at a second speed different to said first speed.

5. A cassette loading device according to claim 4, wherein the number of teeth of said first pinion gear is different from the number of teeth of said second pinion gear.

6. A cassette loading device according to claim 4, wherein teeth of at least one of said first rack gear and said first pinion gear are partly mutilated to terminate rearward movement of said cassette tray when said cassette tray arrives at said first position.

7. A cassette loading device for a cassette recording-/reproducing apparatus including a body having a front panel, comprising:

a cassette tray displaceable in a horizontal direction and reciprocally movable between a first position in which said cassette tray is retracted into the body of the recording/reproducing apparatus for loading a cassette in a predetermined position, and a second position in which said cassette tray is ejected forwardly from the front panel of the body for attachment and detachment of the cassette relative to said cassette tray;

a holder disposed in said cassette tray for holding the cassette, said cassette being one of a first cassette and a second cassette which is smaller in size than said first cassette, said holder including a first holder member for supporting thereon the first cassette and a second holder member disposed below said first holder member for supporting thereon the second cassette, said first holder member having an opening complementary in contour to the shape of the second cassette and receptive of the second cassette for guiding the second cassette when the second cassette is disposed on said second holder member, said second holder member being horizontal, said first holder member having a rearward end pivoted to a rearward end of said second holder member, said first holder member being tiltable with respect to said second holder member and said cassette tray in response to the movement of said cassette tray between said first and second positions, the second holder member being pivotally stationary when the first holder member pivotally tilts;

means responsive to the movement of said cassette tray toward said second position for causing said first holder member to tilt up relative to said second holder member and said cassette tray, with a forward end of said first holder member directed upwardly;

wherein said second holder member having at least one hole, a slider movable between an operative position to open said hole when the first cassette is disposed on said first holder member and an inoperative position to close said hole when the second cassette is disposed on said second holder member, a first reference pin engageable with the first cassette for holding the first cassette in a first level when the first cassette disposed on said first holder member is loaded in a predetermined position, and a second reference pin engageable with said slider while being disposed in said inoperative position, for holding the second cassette in a second level via said slider and said second holder member when the second cassette disposed on said second holder member is loaded in said predetermined position.

8. A cassette loading device according to claim 7, wherein said slider is pivotally mounted on said second holder member and normally held in said inoperative position, further including a select lever pivotally mounted on said second holder member and linked with said slider, said select lever having a portion engageable with the first cassette for urging said slider to move from said inoperative position to said operative position.

9. A cassette loading device for a cassette recording-/reproducing apparatus including a body having a front panel, comprising:

a cassette tray displaceable in a horizontal direction and reciprocally movable between a first position in which said cassette tray is retracted into the body of the recording/reproducing apparatus for loading a cassette in a predetermined position, and a second position in which said cassette tray is ejected forwardly from the front panel of the body for attachment and detachment of the cassette relative to said cassette tray;

a holder disposed in said cassette tray for holding the cassette, said cassette being one of a first cassette and a second cassette which is smaller in size than said first cassette, said holder including a first holder member for supporting thereon the first cassette and a second holder member disposed below said first holder member for supporting thereon the second cassette, said first holder member having an opening complementary in contour to the shape of the second cassette and receptive of the second cassette for guiding the second cassette when the second cassette is disposed on said second holder member, said second holder member being horizontal, said first holder member having a rearward end pivoted to a rearward end of said second holder member, said first holder member being tiltable with respect to said second holder member and said cassette tray in response to the movement of said cassette tray between said first and second positions, the second holder member being pivotally stationary when the first holder member pivotally tilts;

means responsive to the movement of said cassette tray toward said second position for causing said first holder member to tilt up relative to said second holder member and said cassette tray, with a forward end of said first holder member directed upwardly;

a reference pin engageable with a reference hole in the second cassette when the second cassette is disposed on said second holder member, a first engagement portion disposed on said second holder member at a side facing the body of the recording/reproducing apparatus, a second engagement portion adapted to be disposed on the body of the apparatus and engageable with said first engagement portion when said holder is disposed in said predetermined position, and means for forcing the second cassette against said second holder member;

wherein said means for forcing the cassette includes a rotatable circular cam having a cam groove, a pivotable hold lever, a pin disposed on one end of said hold lever and slidably received in said cam groove, a pivotable hold plate linked with an opposite end of said hold lever, said hold plate being pivotally movable in a direction to hold the second cassette in position against displacement relative to said holder in response to rotation of said circular cam, and a spring for urging said hold plate to pivot in a direction away from the second cassette.

10. A cassette loading device according to claim 9, wherein said forcing means further includes a plate spring fixed to a distal end of said hold plate and resiliently engageable with the second cassette.

* * * * *

UNITED STATES PATENT AND TRADEMARK OFFICE
CERTIFICATE OF CORRECTION

PATENT NO. : 5,357,385
DATED : October 18, 1994
INVENTOR(S) : Toshiaki Shimizu, Shigeru Yokota, Mitsuhiko Hara It is certified that error appears in the above-indentified patent and that said Letters Patent is hereby corrected as shown below:

Title page, item [54] and col. 1, line 1,
In the title, after "LOADING" insert --DEVICE--.

Signed and Sealed this

Seventh Day of March, 1995

Attest:

BRUCE LEHMAN

*Attesting Officer*    *Commissioner of Patents and Trademarks*